United States Patent [19]

Ouchi

[11] Patent Number: 5,760,576
[45] Date of Patent: Jun. 2, 1998

[54] ROLLING BEARING UNIT WITH ROTATIONAL SPEED SENSOR HAVING A PAIR OF ANNULAR MAGNETS

[75] Inventor: Hideo Ouchi, Fujisawa, Japan

[73] Assignee: NSK, Ltd., Tokyo, Japan

[21] Appl. No.: 520,570

[22] Filed: Aug. 29, 1995

[30] Foreign Application Priority Data

Nov. 25, 1994 [JP] Japan ................................. 6-291405
May 31, 1995 [JP] Japan ................................. 7-133599

[51] Int. Cl.$^6$ ........................................... G01P 3/48
[52] U.S. Cl. ........................................ 324/174; 384/448
[58] Field of Search ................................ 324/174, 173,
324/207.25, 160, 166, 163; 384/446, 448,
484; 73/118.1, 518, 519; 181/181 A, 181 R

[56] References Cited

U.S. PATENT DOCUMENTS

| | | | |
|---|---|---|---|
| 3,551,712 | 12/1970 | Jones | 324/174 |
| 4,907,445 | 3/1990 | Okumura | 73/118.1 |
| 4,970,462 | 11/1990 | Richmond | 324/174 |
| 5,023,546 | 6/1991 | Pawlak et al. | 324/174 |
| 5,023,547 | 6/1991 | Pawlak et al. | 324/174 |
| 5,385,410 | 1/1995 | Shirai et al. | 324/174 |
| 5,491,407 | 2/1996 | Maxson et al. | 324/174 |
| 5,510,708 | 4/1996 | Shirai et al. | 324/207.25 |
| 5,530,344 | 6/1996 | Caillaut et al. | 384/448 |

Primary Examiner—Sandra L. O'Shea
Assistant Examiner—Jay M. Patidar
Attorney, Agent, or Firm—Evenson, McKeown, Edwards & Lenahan, P.L.L.C.

[57] ABSTRACT

A rolling-bearing unit including a stationary ring, a rotating ring, an annular magnetic tone wheel having a cutout section with cutouts formed at equal intervals at a pitch, and a sensor facing the tone wheel. The sensor comprises a pair of annular or cylindrical permanent magnets arranged concentric with the tone wheel, an annular or cylindrical stator of magnetic material magnetically connected with the permanent magnets and provided concentric with the tone wheel, and an annular or cylindrical coil provided concentric with the tone wheel and proximate a central portion of the stator. Like magnetic poles of the pair of permanent magnets are magnetically connected to opposite ends of the stator. Peripheral faces of either the magnets or ring portions of the stator are formed with alternating recesses and protrusions with the same pitch as in the cutout section of the tone wheel and facing the cutout section of the tone wheel. The phase of the alternating recesses and protrusions of the peripheral face at one axial end of the stator relative to the cutout section is displaced by one half from the phase of the recesses and protrusions of the peripheral face at the other axial end of the stator relative to the cutout section.

16 Claims, 16 Drawing Sheets

ROLLING BEARING UNIT WITH ROTATIONAL SPEED SENSOR HAVING A PAIR OF ANNULAR MAGNETS

BACKGROUND OF THE INVENTION

1. Field of the Invention

The present invention is related to a rolling bearing unit with a rotational speed sensor which is used to rotatably support an automobile wheel with a suspension apparatus, while it is used to detect the rotational speed of the wheel.

2. Description of the Related Art

A rolling unit with rotational speed sensor that is used to rotatably support an automobile wheel with respect to a suspension apparatus, and that is used to control an anti-lock brake system (ABS) or traction-control system (TCS) by detecting the rotational speed of the wheel, has been disclosed in U.S. Pat. No. 4,907,445 as shown in FIG. 12.

The rolling bearing unit with rotational speed sensor shown in FIG. 12 comprises a hub 3 that has a flange section 1 located on its axially outer end portion (outer end portion in a widthwise direction when installed in the vehicle: left end portion in FIG. 12) to secure the automobile wheel (not shown) and a first inner raceway 2a located around the outside peripheral surface in the central portion of the hub 3, an inner ring member 4 that is fitted around the outside peripheral surface in the central portion of this hub 3 and has a second inner raceway 2b around its outside peripheral surface, a nut 6 that is screwed onto a male screw portion 5 formed on the outside peripheral surface of the axially inner end portion (inner end portion in a widthwise direction when installed in the vehicle: the right end portion in FIG. 12) of the hub 3 so as to press against the axially inner end face of the inner ring member 4 and to secure this inner ring member 4 to a prescribed location on the outside peripheral surface of the hub 3, an outer ring member 9 that has outer raceways 8a, 8b in rows around its inside peripheral surface and a mount section 7 around its outside peripheral surface for securing it to the suspension apparatus (not shown in the figures), and a plurality of rolling bodies or members 10 that are located between the outer raceways 8a, 8b and the inner raceways 2a, 2b respectively. Thus, the hub 3, to which the automobile wheel (not shown) is secured, is rotatably supported inside the outer ring member 9 that is supported by the suspension apparatus.

In FIG. 12, there is a cylindrical tone wheel 11 securely fitted around the axially inner half (right half in FIG. 1) of the inner ring member 4. An uneven section 12 having recesses and lands is formed on the axially inner end face of the tone wheel 11 (this is the end surface facing inward in a widthwise direction when installed in the vehicle; the right end face in FIG. 12) and the magnetic characteristics of this axially inner end face change, alternating at equal intervals in the circumferential direction. The recesses of the uneven section 12 form a cutout section.

Moreover, a cover 13 covers the opening on the axially inner end of the outer ring member 9. Provided in this cover 13 is a sensor 14 whose axially outer end face is opposed to the uneven section 12 of the tone wheel 11.

When using the rolling bearing unit with rotational speed sensor constructed as described above, the automobile wheel (not shown) secured to the flange section 1 formed on the axially outer end of the hub 3 is supported so that it rotates freely with respect to the suspension apparatus (not shown) to which the outer ring member 9 is supported. Also, as the tone wheel 11 secured around the inner ring member 4 rotates as the automobile wheel rotates, the output of the sensor 14, which is faced to the uneven section 12 formed on the axially inner end of the tone wheel 11, changes. The frequency at which the output of the sensor 14 changes is proportional to the rotational speed of the automobile wheel, and therefore if the output signal from the sensor 14 is input into a controller (not shown), the rotational speed of the wheel can be used to adequately control an ABS or TCS.

In the prior art rolling bearing unit with rotational speed sensor as described above, it is difficult to make it compact in size keeping enough output.

Specifically, in the rotational speed sensors, generally the tone wheel 11 is made from a magnetic material, and the sensor 14 faced to the tone wheel 11 is comprised of a built-in permanent magnet and a stator of magnetic material and a coil wound around the stator to flow the magnetic flux from the permanent magnet through the stator.

As the uneven section 12 rotates, the density of the magnetic flux flowing in the stator changes, so that the voltage generated in the coil 14 changes at a frequency proportional to the rotational speed.

In order to increase the output of the sensor 14 in the rotational speed sensor as constructed above, the magnet force of the permanent magnet is intensified, in other words, the density of the magnetic flux is increased, so that the large change in density of the magnetic flux through the stator occurs.

However, if simply the magnetic force is intensified, the magnetic flux is saturated in the stator. With a saturation of magnetic flux, the changes in density of the magnetic flux through the stator is excessively reduced in spite of the rotation of the uneven section 12, so that the output of the sensor 14 is reduced. Accordingly, when the magnetic force of the permanent magnet is intensified, the cross sectional area of the stator must also be enlarged, resulting in the large size of the sensor 14.

European Patent Publication No. 0431749 A discloses a compact sensor which can generate a large output by preventing the saturation of magnetic flux in the sensor, the structure of which is shown in FIG. 13 and FIG. 14.

The tone wheel 11a rotating with a rotating ring is formed with an uneven section having recesses and lands in a gear-shape on its outer peripheral surface with the same pitch in a circumferential direction.

The sensor 14a comprises a stator 15 of magnetic material disposed in a circumferential direction, a pair of permanent magnets 16a, 16b disposed on the opposite end portions of the stator 15, and a coil 17 wound around the central portion of the stator 15.

The permanent magnets 16a, 16b are magnetized in a radial direction of the tone wheel 11a, so that the same poles (N pole in the illustrated example) are faced to the tone wheel 11a. A magnetic field as shown in FIG. 14 is formed around the sensor 14a.

The phase of the permanent magnet 16a (located left in FIGS. 13 and 14) with reference to the uneven section formed on the tone wheel 11a is half displaced from that of the permanent magnet 16b (located right in FIGS. 13 and 14) with reference to the uneven section formed on the tone wheel 11a. Accordingly, at the same time that the permanent magnet 16a is faced to the lands on the outer peripheral surface of the tone wheel 11a, the permanent magnet 16b is faced to the recesses. In this moment, the magnetic resistance between the permanent magnet 16a and the tone wheel 11a is smaller than that between the permanent magnet 16b and the tone wheel 11a. Consequently, the magnetic field produced by the permanent magnet 16a is stronger than that by the permanent magnet 16b. On the contrary, as shown in FIG. 14, at the moment where the permanent magnet 16a is faced to the recesses in the outer peripheral surface of the tone wheel 11a while the permanent magnet 16b is faced to the lands, the magnetic resistance between the permanent magnet 16a and the tone wheel 11a is larger than that between the permanent magnet 16b and the tone wheel 11a. Consequently, the magnetic field produced by the permanent magnet 16a is stronger than that produced by the permanent magnet 16b.

The magnetic fields produced by the pair of permanent magnets 16a, 16b on the opposite end portions of the stator 15 change alternatively, stronger and weaker, the density of the magnetic flux through the stator 15 changes largely, so that specifically the central portion of the stator 15 experiences alternating magnetic fluxes through it. Consequently, the magnetic flux in the stator is hardly saturated, the voltage induced the winding of coil 17 around the stator 15 becomes large.

The inventors of this invention confirmed through experiments that the output of the sensor 14a constructed as in FIG. 13 and 14, is larger than that of a common structure like the sensor 14 (FIG. 12) having a single permanent magnet.

In the structure as disclosed in European Patent Publication No. 0426298 A1, the sensor is of an annular shape, so that the inner peripheral surface of the sensor is radially faced to the outer peripheral surface of the tone wheel along the whole circumference to obtain a larger output. This is shown in FIG. 15.

In the rolling bearing unit with rotational speed sensor in this European Patent Publication, a cover 13 is securely fitted into the opening at the axially inner end of the outer ring member 9, and an annular sensor 14b is securely supported in the inner peripheral surface of the cover 13, so that the inner peripheral surface of the sensor 14b is radially faced to the outer peripheral surface of the tone wheel 11a along the whole circumference with a small clearance between them.

The change in magnetic flux through the sensor 14b is enlarged in amount by the opposed relationship throughout the circumference between the inner peripheral surface of the annular sensor 14b and the outer peripheral surface of the tone wheel 11a, so that the output of the sensor 14b is becomes large.

FIG. 16 and FIG. 17 show a rolling bearing unit with rotational speed sensor as disclosed in HATSUMEI KYOKAI Technical Report Publication No. 94-16051. On the axially inner end portion of the inner-ring member 4, there is a tone wheel 11b, whose base (left end in FIGS. 16 and 17) is fitted around a portion axially spaced from the inner-ring raceway 2b.

This tone wheel 11b is made of magnetic metal plate such as steel, and is entirely annular or short-cylindrical. This tone wheel 11b comprises a smaller-diameter section 18, a larger-diameter section 19 and a stepped section 20 that are continuous and concentric with each other.

This kind of tone wheel 11b is fixed to the inner-ring member 4, such that the larger-diameter section 19 is fitted around the outer peripheral surface on the axially inner end portion of the inner-ring member 4, so that the stepped section 20 comes in contact with the edge of the inner-ring member 4. Therefore the smaller-diameter section 18 is supported so that it is concentric with the inner-ring member 4. There are several through-holes 21 formed around this smaller-diameter section 18 at equal intervals in the circumferential direction to form a rotating cutout section. Thus, the circumferential magnetic characteristics are alternatively changed at an equal interval. Each of these through-holes 21 are identical and are rectangular shaped to extend in the axial direction (left and right in FIGS. 16 and 17).

The opening on the inside end portion of the outer-ring member 9 is covered by a cover 13.

Disposed on the inner peripheral surface of this cover 13, is an annular-shaped sensor 14c which is embedded in a synthetic resin mass 22 in an annular shape. This sensor 14c comprises a permanent magnet 16c, a stator 15a made of magnetic material such as steel plate, and a coil 17. By embedding the permanent magnet 16c, stator 15a and coil 17 in the synthetic resin mass 22, the sensor 14c can be made generally annular.

Of these components which make up the sensor 14c, the permanent magnet 16c is formed so that it is generally annular (ring shaped) and magnetized so that its magnetic orientation is in the radial direction. The inner peripheral surface of this permanent magnet 16c is faced, through a small clearance or gap 23, to the outer peripheral surface of a base portion of the smaller-diameter section 18 of the tone wheel 11b where the holes 21 are not formed.

The stator 15a is formed so that it is entirely annular and has a substantially J-shaped cross section. The inner peripheral surface on the axially outer end of the radially outer cylindrical section 24 of the stator 15a is very near or comes in contact with the outer peripheral surface of the permanent magnet 16c. Moreover, the inner peripheral surface of the radially inner cylindrical section 25 of the stator 15a is faced to a portion of the tone wheel 11b where the holes 21 are formed. Furthermore, a plurality of multiple stationary notches or cutouts 26 are formed in the stationary cutout portion around the radially inner cylindrical section 25 of the stator 15a, so that they are located around the cylindrical section 25 circumferentially with the same pitch as the holes 21. The pitch is also referred to as center-angle pitch throughout the invention. Also, the radially inner cylindrical section 25 is formed so that it is comb-toothed.

The coil 17 is formed by winding a conductive wire around a non-magnetic bobbin 27 so that it is annular shaped, and it is located on the inner peripheral side of the radially outer cylindrical section 24 of the stator 15a. The electromotive force (emf) generated in this coil 17 is output from a connector 28 that protrudes from the outer surface of the cover 13.

When using the rolling-bearing unit with rotational speed sensor constructed as described above, as the tone wheel 11b rotates with the hub 1, the density of the magnetic flux flowing in the stator 15a, which is faced to the tone wheel 11b, changes, so that the voltage generated in the coil 17 changes at a frequency that is proportional to the rotational speed of the hub 1.

The theory behind the change of voltage generated in the coil 17 due to the change in density of the magnetic flux flowing in the stator 15a is the same as that applied for rotational speed sensors that have been widely used in the prior art. The reason that the density of the magnetic flux flowing in the stator 15a changes due to the rotation of the tone wheel 11b is described below.

The holes 21 formed around the tone wheel 11b and the notches or cutouts 26 formed around the stator 15a have the same pitch, so that as the tone wheel 11b rotates, there are moments when they are all faced to each other at the same time. At the moment when these holes 21 and notches or cutouts 26 are faced to each other, the magnetic column sections located between each pair of adjacent holes 21 and the magnetic tongue-shaped sections located between each pair of adjacent notches or cutouts 26 are faced to each other through a very small gap 23. When the magnetic column sections and magnetic tongue-shaped sections are faced to each other, the density of the magnetic flux flowing between the tone wheel 11b and the stator 15a is high.

In contrast to this state, when the holes 21 and notches or cutouts 26 are half out of phase, the density of the magnetic flux flowing between the tone wheel 11b and the stator 15a becomes low. In other words, in this state, the holes 21 formed around the tone wheel 11b are faced to the tongue-shaped sections, while at the same time, the notches or cutouts 26 formed around the stator 15a are faced to the column sections. When the column sections are faced to the notches or cutouts 26 and the tongue-shaped sections are faced to the holes 21, there is a comparatively large gap or clearance between the tone wheel 11b and the stator 15a generally in the circumference. In this state, the density of the magnetic flux flowing between the tone wheel 11b and the stator 15a becomes low. As a result, the voltage generated in the aforementioned coil 17 changes proportionally with the rotational speed of the hub 1.

By using a sensor 14c like described above, the output voltage generated in the coil 17 changes with a frequency proportional to the rotational speed of the hub 1, however there is an annular limited space that necessarily exists in the opening end of the outer-ring member 8. It is possible to install this sensor 14c in this annular limited space, and it is possible to make the output of the sensor 14c sufficiently large enough to reliably detect the rotational speed of the hub 1 rotating together with the vehicle wheel.

The permanent magnet 16c, stator 15a and coil 17, which make up the sensor 14c are all formed in an annular shape that entirely surrounds the tone wheel 11b. Since the magnetic flux that comes from the permanent magnet 16c flows all the way around the stator 15a, the amount of magnetic flux that flows inside the stator 15a can be made sufficiently large enough for this stator 15a. Thus the change in voltage in the coil 17 that corresponds to the change in density of the magnetic flux passing through the stator 15a, can be made large.

In the three kinds of rotational speed sensors as shown in FIG. 13 to FIG. 17, the output of the sensors 14a to 14c can be made larger than those of the rotational speed sensors as shown in FIG. 12. However, they can not follow to the requirement of much larger output.

The sensor 14a in FIGS. 13 and 14 has an optimum size in length to obtain the maximum output, and the output may be lowered by simply elongating the circumferential length.

The basic construction of the sensor 14b, 14c as shown in FIG. 15 to FIG. 17, is similar to those generally known in the prior art, wherein the magnetic flux flows in a single direction, not alternatively in the opposite directions, so that it is difficult to intensify the magnetic force of the permanent magnet to make the output larger.

If the sensor 14a having a construction as shown in FIGS. 13 and 14 could be of an annular shape as in the sensors 14b and 14c of FIG. 15 to FIG. 17, the combination of advantages of the sensors 14a, 14b and 14c would lead to a sensor of larger output. However, it is not known in the art to combine the sensors 14a, 14b and 14c with their advantages kept.

The rolling bearing unit with rotational speed sensor of this invention is provided taking into consideration the situation explained above.

SUMMARY OF THE INVENTION

An object of the present invention is to provide a rolling bearing unit having a rotational speed sensor which can be installed in a limited space, and make the sensor output sufficiently large, so that the rotational speed of the member rotating with the rotating ring assembly is detected positively.

Another object of the present invention is to provide a rolling bearing unit with rotational speed sensor comprising a tone wheel with a cutout section and a sensor having a pair of permanent magnets with protrusions/recesses and a stator such that the intensity of magnetic field generated by the pair of permanent magnets changes alternatively between the moment where the protrusions at one end of the permanent magnets are opposed to the cutout section and the moment where the protrusions at the other end of the permanent magnets are opposed to the cutout section, wherein the magnetic flux through the stator is hardly saturated, and the central portion of the stator experiences the alternative magnetic flux so that a sufficiently large voltage is induced in the coil adjacent the stator, to make the sensor output large.

DESCRIPTION OF THE PREFERRED EMBODIMENTS

Figure 1:
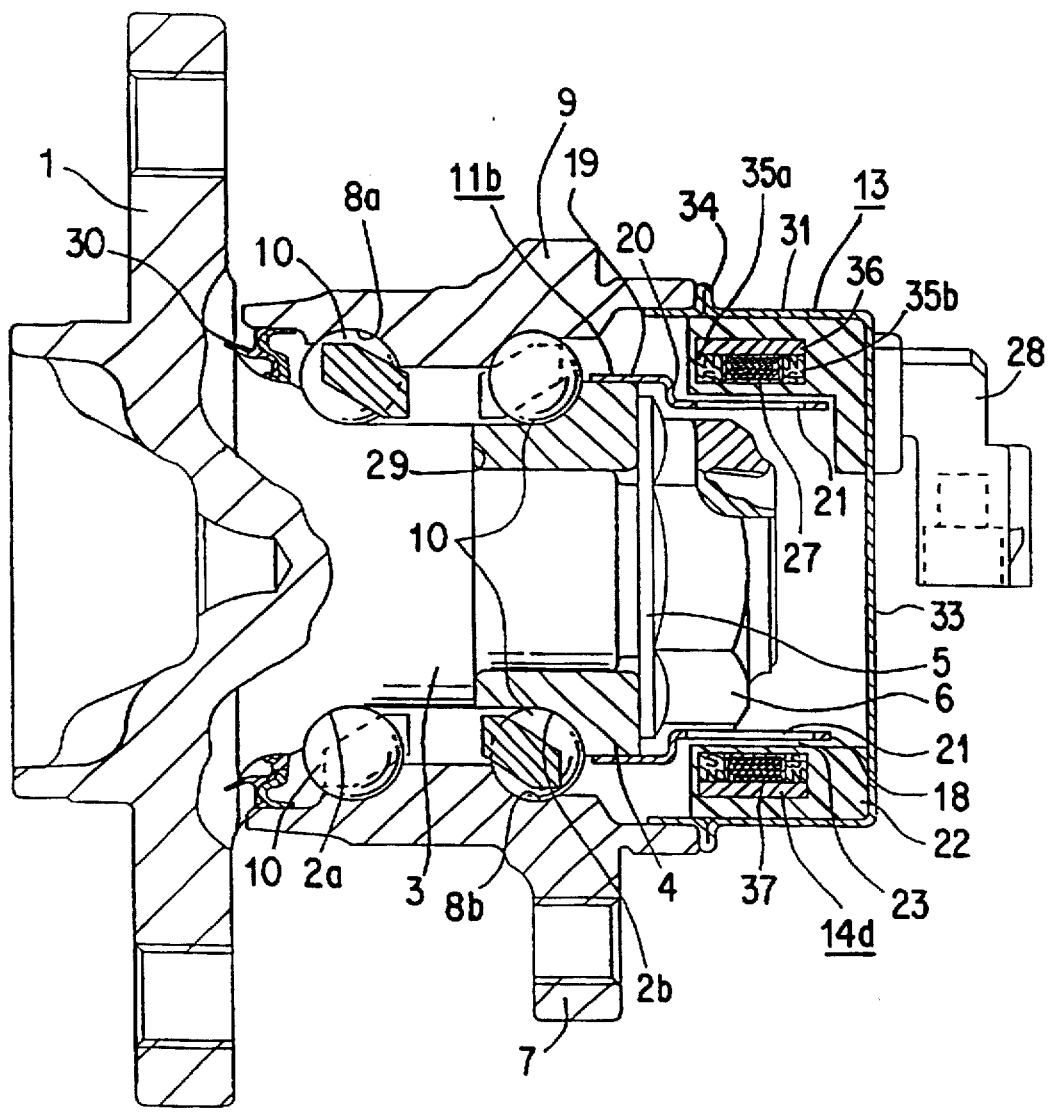
FIG. 1 is a cross sectional view of a first embodiment of the rolling bearing unit with rotating speed sensor in the present invention.

Like the prior art rolling-bearing unit with rotational speed sensor described above, the rolling-bearing unit with rotational speed sensor of this invention comprises a stationary ring that has a stationary raceway on a first peripheral surface, a cover attached to the end of this stationary ring, a rotating ring that has a rotating raceway on a second peripheral surface opposed to the first peripheral surface of the stationary ring, a plurality of rolling bodies that rotate freely between the stationary raceway and the rotating raceway, an annular tone wheel made of magnetic material that is attached to the end of the rotating ring and which has a rotating cutout section having cutouts formed at equal intervals all the way around in the circumferential direction, and an annular sensor that is supported inside the cover so that it is faced to the tone wheel.

The sensor comprising a pair of annular or cylindrical permanent magnets concentric with the rotating ring, an annular or cylindrical stator of magnetic material magnetically connected with permanent magnets and provided concentric with the rotating ring, and an annular or cylindrical coil provided concentric with the rotating ring and in the central portion of the stator. The ends in magnetic orientation of the pair of permanent magnets or the both ends of the stator are provided so as to sandwich the central portion of the stator to have the same pole and to be faced to the cutting section of the tone wheel with a small clearance therebetween. And, the pair of ends faced to the cutout section with the small clearance therebetween are formed with recesses/protrusions with the same pitch as in the cutout section of the tone wheel, and wherein the phase of the recesses/protrusions formed in one of the pair of ends relative to the cutout section is half displaced from the phase of the recesses/protrusions formed in the other of the pair of ends relative to the cutout section.

FIGS. 1 to 4 show a first embodiment of the present invention. A hub 3 has an axially outer end portion which is formed with a flange 1 for wheel fixture on its outer peripheral face, a mid-portion which is formed with an inner ring raceway 2a (rotating raceway) and a step portion 29 on its outer peripheral face, and an axially inner end portion on which an inner ring 4 is provided on its outer peripheral face so that an inner ring raceway 2b (rotating raceway) is formed. The inner ring 4 is externally fitted to the outer peripheral face of the hub 3 with an axially outer end face thereof (left end face in FIG. 1) abutted against the step portion 29, thus constituting a rotating ring assembly together with the hub 3.

There is also the case where, instead of directly forming the inner ring raceway 2a on the outer peripheral face of the hub 3, it is formed as an inner ring (not shown) separate from the hub 3, and externally fitted to the hub 3 together with the inner ring 4.

A threaded portion 5 is formed on the axially inner end portion of the hub 3. The inner ring 4 is fixed at a predetermined location on the outer peripheral face of the hub 3 by means of a nut 6 which is threaded onto the threaded portion 5 and tightened.

An outer ring member or fixed ring member 9 located around the hub 3 has a mid-portion which is provided with an attachment portion 7 on an outer peripheral face thereof, for fixing the outer ring member 9 to a suspension unit. An inner peripheral face of the outer ring member 9 is formed with respective outer ring member raceways or fixed raceways 8a, 8b opposite to the inner ring raceways 2a, 2b.

A plurality of rolling bodies 10 are respectively provided between the two inner ring raceways 2a, 2b and the pair of outer ring member raceways 8a, 8b so that the hub 3 is rotatable inside the outer ring member 9.

In the case of a hub unit for heavy vehicles, tapered rollers are used for the rolling bodies instead of the balls shown in FIG. 1.

A seal ring 30 is fitted between the inner peripheral face at the axially outer end of the outer ring member 9, and the outer peripheral face of the hub 3, to cover the opening at axially outer end of the space in which the plurality of rolling bodies 10 are provided between the inner peripheral face of the outer ring member 9 and the outer peripheral face of the hub 3.

Figure 16:
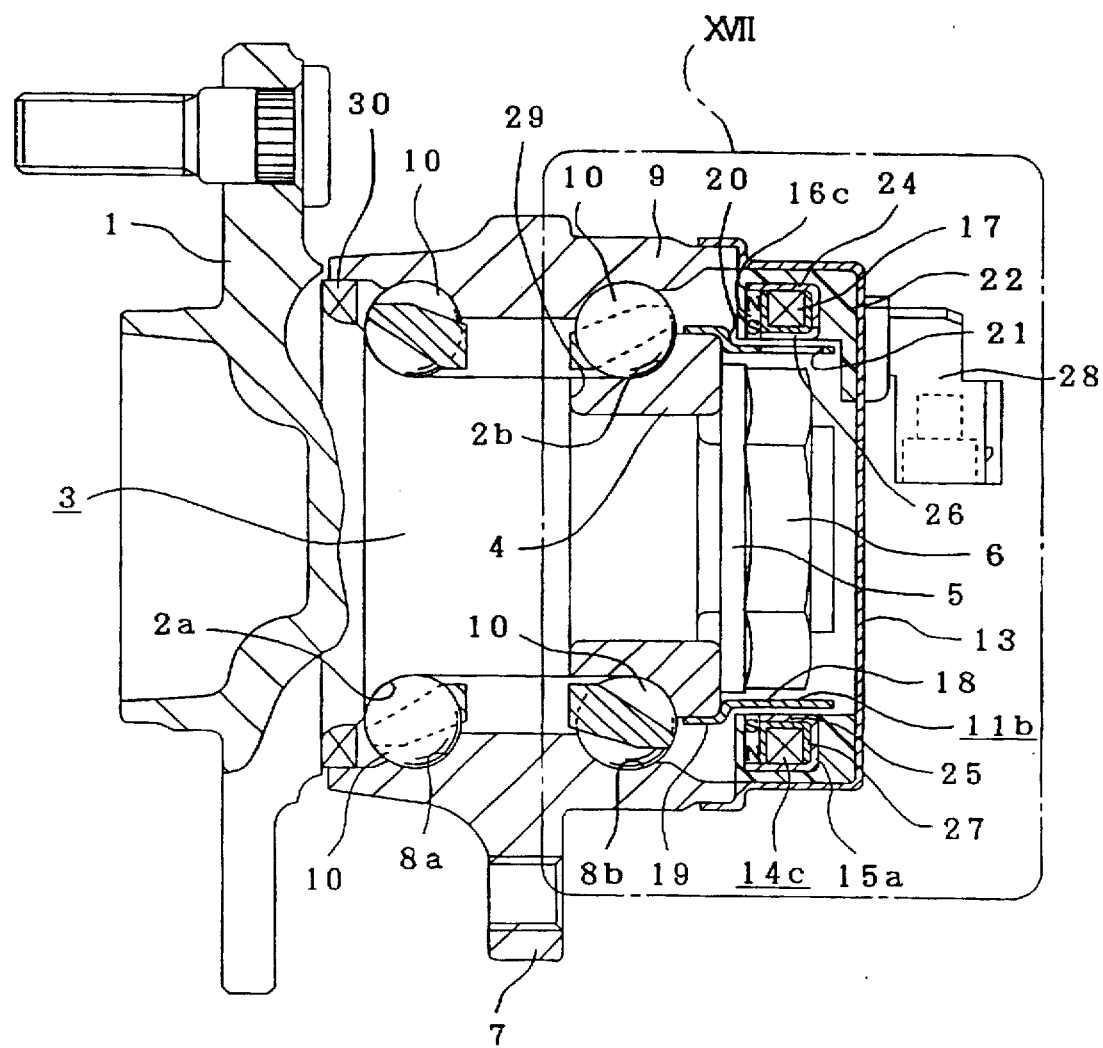
FIG. 16 is a cross sectional view of fourth example of the prior art rolling bearing unit with rotating speed sensor.
Figure 17:
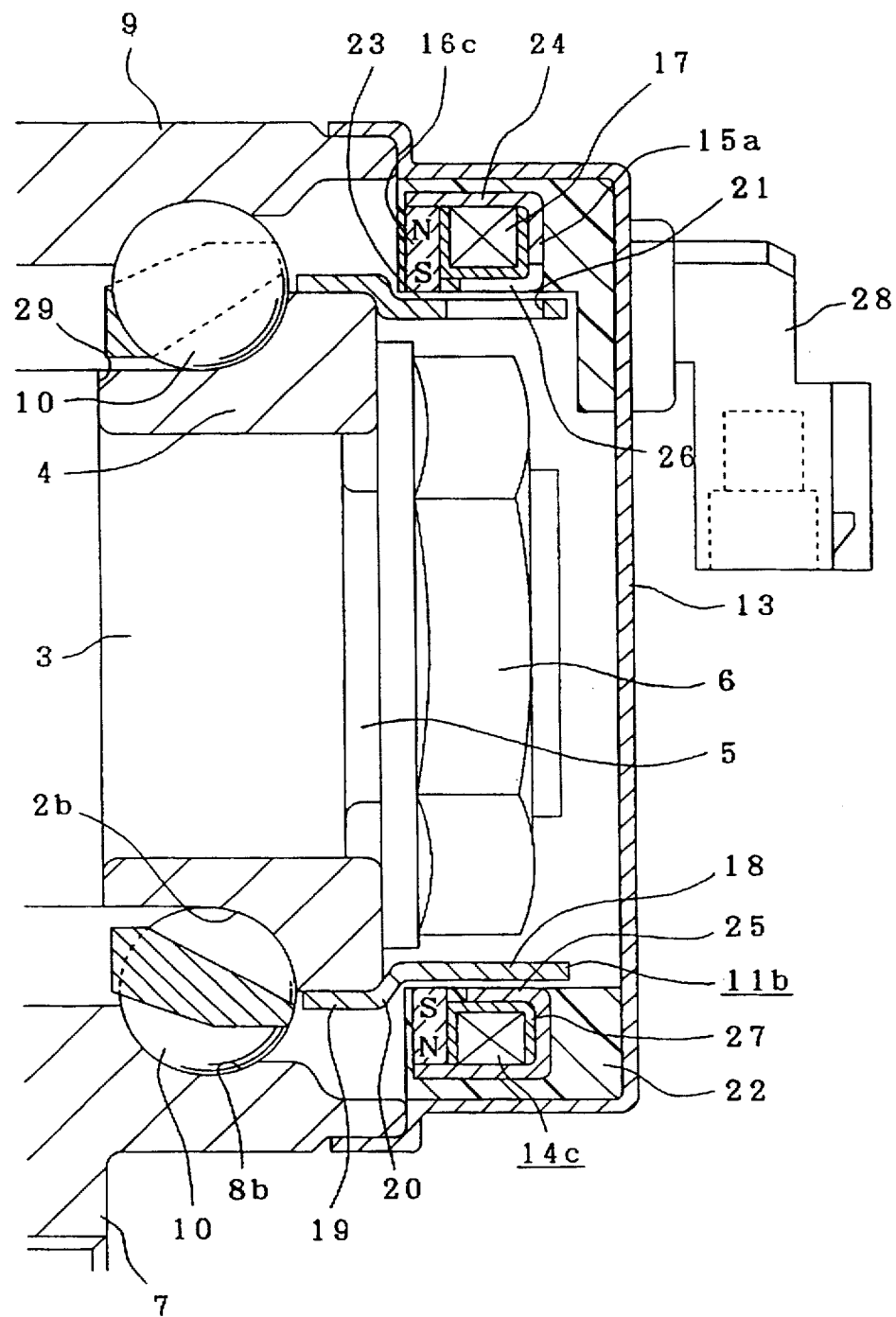
FIG. 17 is an enlarged view of the portion XVII in FIG. 16.

A tone wheel 11b similar to the tone wheels fitted to the conventional configurations shown in FIGS. 16 and 17, has a base end (left end in FIGS. 1 and 2) which is externally fixed to a portion on an axially inner end (right end in FIGS. 1 and 2) of the inner ring 4 which is spaced from the inner ring raceway 2b.

An opening at the axially inner end of the outer ring member 9 is covered with a cover 13 made for example by press forming a metal sheet of stainless steel, or aluminum alloy and the like into the form of a bottomed cylinder having a cylindrical portion 31.

A synthetic resin body 22 in which is embedded an annular sensor 14d (to be described later) is fixedly retained within the cylindrical portion 31. An opening at the axially inner end (right end in FIGS. 1 and 2) of the cylindrical portion 31 is covered with an end plate 33. An outer peripheral face of a portion of the cylindrical portion 31 near the axially outer end (the left end in FIGS. 1 and 2) is formed with a brim 34. The axially outer end of the cylindrical portion 31 which protrudes axially from the brim 34, is internally fitted into the axially inner end portion of the outer ring member 9, with the brim 34 abutted against the axially inner end face of the outer ring member 9.

The cover 13 of the above construction is not used as a flow path for a magnetic flux from permanent magnets 35a, 35b constituting a sensor 14d (to be described hereunder), and is therefore preferably made from a non-magnetic material such as synthetic resin, aluminum alloy or copper. Accordingly when stainless steel plate is used, the use of a non-magnetic stainless steel is preferable from the point of view of preventing leakage of the magnetic flux. When with the object of reducing costs, the cover 13 is made of a magnetic material such as low carbon steel sheet, then the distance between the members constituting the sensor 14d and the inner face of the cover 13 must be made sufficiently large. The synthetic resin body 22 in which is embedded the overall annular shaped sensor 14d is fixedly fitted inside this cover 13.

The sensor 14d comprises a pair of permanent magnets 35a, 35b, a stator 36, and a coil 37, respectively formed in an annular or cylindrical shape. The stator 36 is formed in a cylindrical shape from a magnetic material such as steel plate of sufficient thickness to avoid magnetic flux saturation.

Figure 3:
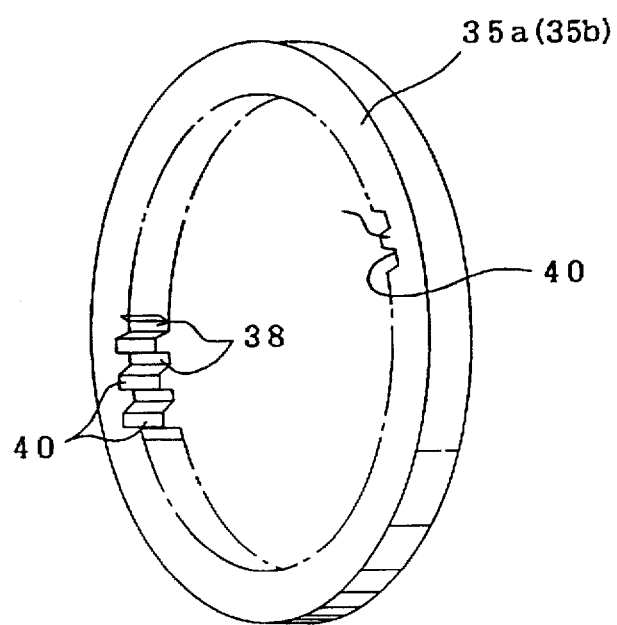
FIG. 3 is a perspective view of the permanent magnet.

A plurality of protrusions/recesses are formed on the inner peripheral faces of the respective permanent magnets 35a, 35b around the circumference with the same pitch (referred to as the central angle pitch throughout the whole of this specification) as that of through-holes 21 formed in the tone wheel 11b. The inner peripheral rims of the respective permanent magnets 35a, 35b are thus formed in a gear shape as shown in FIG. 3.

The permanent magnets 35a, 35b, are respectively magnetized diametrically in the same direction. For example, with the embodiment shown in FIGS. 1 to 4, the inner peripheral faces of the permanent magnets 35a, 35b are made south poles, while the outer peripheral faces are made north poles. Moreover, the magnetized direction does not change around the circumferential direction. The outer peripheral faces of the permanent magnets 35a, 35b are arranged close to or in contact with respective inner peripheral faces on opposite end portions of the stator 36, so that the permanent magnets 35a, 35b and the stator 36 are magnetically connected together. The magnetized direction may be opposite to that in the figures as desired or required.

The inner peripheral rims of the pair of permanent magnets 35a, 35b are opposed, across a small gap 23, to the portions of a small diameter portion 18 of the tone wheel 11b, specifically to the appropriately opposite ends of the through-holes 21 formed in the small diameter portion 18.

Figure 2:
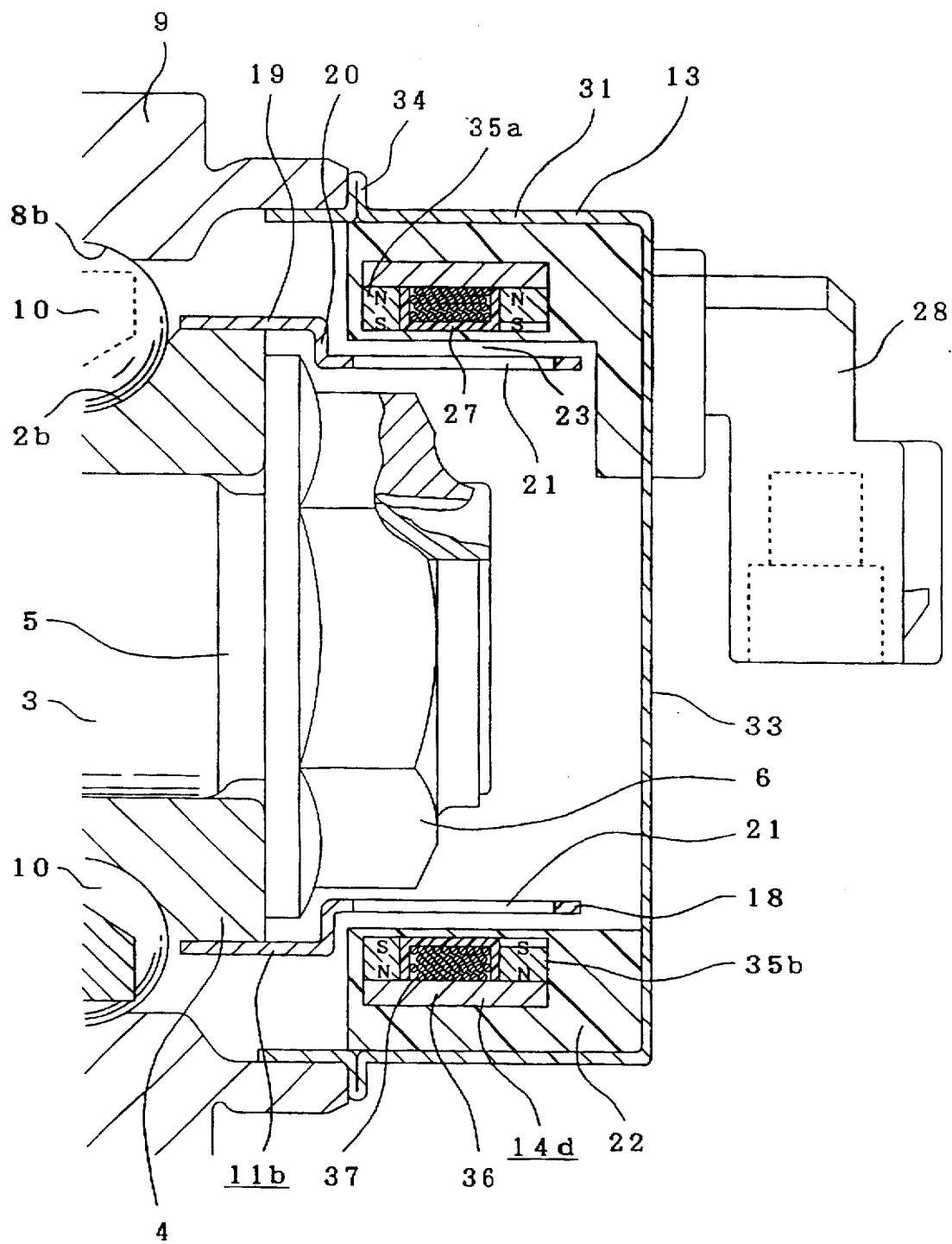
FIG. 2 is an enlarged view of the right side portion in FIG. 1.
Figure 4:
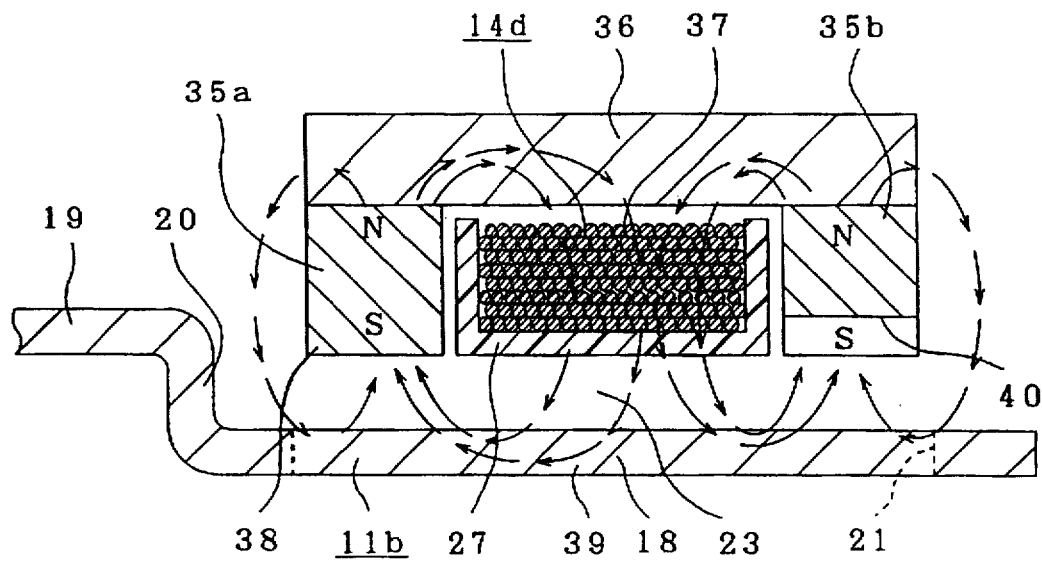
FIG. 4(A) and FIG. 4(B) are a partial enlarged cross-sectional view of the tone wheel and sensor, for explaining the conditions for changing magnetic flux in stator.
Figure 4:
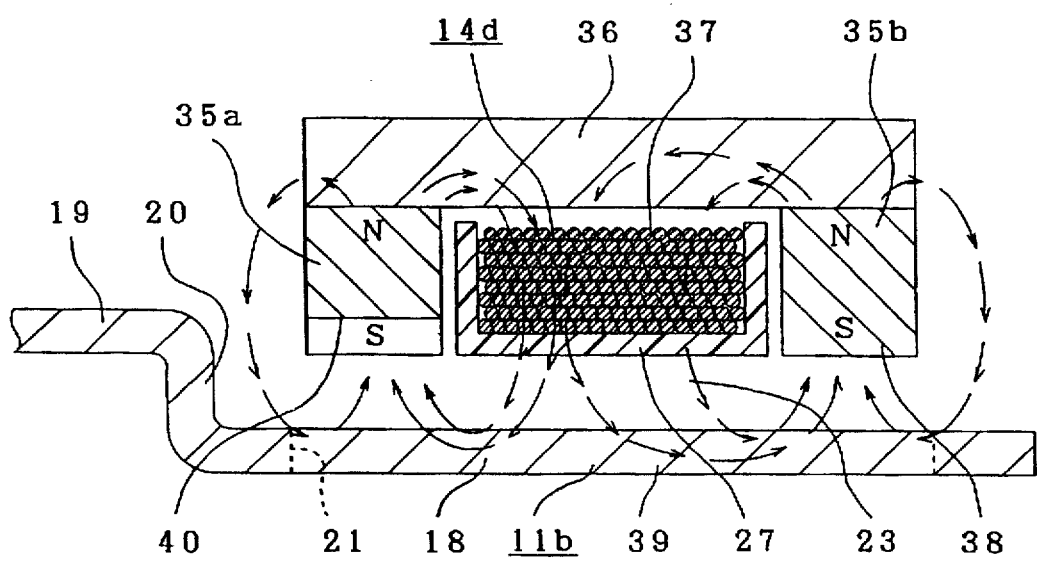

The phase, relative to the through-holes 21, of the recesses/protrusions on the inner peripheral rim of the permanent magnet 35a (the left one in FIGS. 1, 2 and 4) in the pair of permanent magnets 35a, 35b, is displaced by one half with respect to the phase, relative to the through-holes 21, of the recesses/protrusions on the inner peripheral rim of the permanent magnet 35b (the right one in FIGS. 1, 2 and 4). Therefore, with the present embodiment shown in FIGS. 1 to 4, the phases in the circumferential direction of the pair of permanent magnets 35a, 35b are displaced relative to each other by half the pitch of the recesses/protrusions.

Accordingly, as shown in FIG. 4(A), at the point in time when the protrusions 38 formed in the inner peripheral rim of the permanent magnet 35a are faced to the columns 39 between the adjacent through-holes 21, the recesses 40 formed in the inner peripheral rim of the permanent magnet 35b are faced to the columns 39. On the other hand, as shown in FIG. 4(B), at the point in time when the recesses 40 formed in the inner peripheral rim of the permanent magnet 35a are faced to the columns 39, the protrusions 38 formed in the inner peripheral rim of the permanent magnet 35b are faced to the columns 39.

Figure 8:
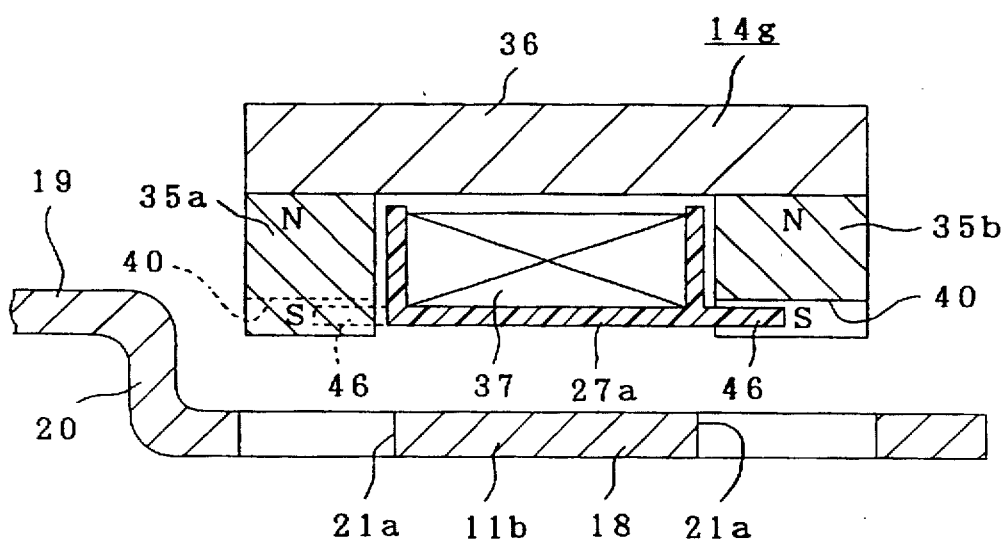
FIG. 8 is an enlarged cross-sectional view of the tone wheel and sensor to show a fourth embodiment of the invention.

The respective through-holes 21 need not necessarily be formed as an elongate through-holes which is simultaneously faced to the pair of permanent magnets 35a, 35b. For example, as shown in FIG. 8 (to be discussed later) they may be formed as short through-holes 21a in two rows in the portions faced to the permanent magnets 35a, 35b, with no aperture in the portion faced to the inner peripheral face of the coil 37. In this way, distortion of the tone wheel 11b when forming the through-holes can be minimized.

If, as with the present embodiment, long through-holes are adopted in the arrangement for changing the magnetic resistance at the rims of the permanent magnets 35a, 35b which are located at axially opposite ends of the cylindrical coil 37, then the through-holes must be long to correspond to the axial length of the coil 37, requiring a large press unit for forming the through-holes. On the other hand, if as mentioned above, the through-holes are separated into two rows of short through-holes, then the punching operation can be carried out with a low capacity press unit (small size and low cost).

Moreover, displacement of the phase of the pair of permanent magnets 35a, 35b relative to the through-holes can be carried out on the side of tone wheel 11b. For example, with the phases of the pair of permanent magnets 35a, 35b adjusted around the peripheral direction relative to each other, the phases of the through-holes formed in the two rows may be displaced by one half to displace the phases of the pair of permanent magnets 35a, 35b relative to the through-holes, as with the embodiment shown in the FIGS. 1 to 4.

The coil 37 is internally fitted within the inner peripheral face at its central portion of the stator 36 and clamped from opposite axial ends by the pair of permanent magnets 35a, 35b. More specifically, the coil 37 is wound around the outer peripheral face of a bobbin 27. The bobbin 27 is made from a non-magnetic material such as synthetic resin and is formed in a C-shape in cross section with an open outer periphery. The coil 37 with the bobbin 27 is fitted with this bobbin 27 inside the stator 36.

Ends of lead wires of the coil 37 are taken out from the stator 36 through a hole formed in the outer peripheral surface of the stator 36, and connected to terminals in a connector 28 provided on the outside of the end plate 33. The electromotive force induced in the coil 37 can thus be taken out by way of the connector 28. An opening is thus formed in a part of the end plate 33 of the cover 13 at a portion where the connector 28 is fitted. A plug (not shown) on the end of a harness (not shown) for taking out the signal, is inserted into the connector 28. The connector 28 which is formed from a synthetic resin material, is made by first forming the synthetic resin body 22 in which is embedded the sensor 14d, and then after internally fitting the synthetic resin body 22 into the cover 13, forming a second synthetic resin portion on the outer face of the cover 13.

During use of the speed sensing rolling bearing unit according to the present invention constructed as described above, when the hub 3 and tone wheel 11b rotate together, an electromotive force which changes with a frequency proportional to the rotational speed of the tone wheel 11b, is induced in the coil 37 of the sensor 14d which is faced to the small diameter portion 18 of the tone wheel 11b. The reason that an electromotive force is induced in the coil 37 with rotation of the tone wheel 11b is as follows:

At first, as shown in FIG. 4 (A), at the point in time wherein the protrusions 38 of the recesses/protrusions formed on the inner peripheral rim of the permanent magnet 35a are opposed to the columns 39 between the adjacent through-holes 21, the recesses 40 of the recesses/protrusions formed in the inner peripheral rim of the permanent magnet 35b are opposed to the columns 39. Accordingly, the magnetic resistance between the inner peripheral rim of the permanent magnet 35a and the tone wheel 11b becomes smaller than that between the inner peripheral rim of the permanent magnet 35b and the tone wheel 11b. As a result, as shown by the arrows in FIG. 4 (A), the magnetic field due to the permanent magnet 35a becomes stronger than that due to the permanent magnet 35b. Accordingly, a magnetic flux flows in the axially central portion of the stator 36 in a direction corresponding to the magnetic field due to the permanent magnet 35a (to the right in the example of FIG. 4(A)).

On the other hand, as shown in FIG. 4 (B), at the point in time wherein the recesses 40 of the recesses/protrusions formed in the inner peripheral rim of the permanent magnet 35a are opposed to the columns 39, the protrusions 38 of the recesses/protrusions formed in the inner peripheral rim of the permanent magnet 35b are opposed to the columns 39. Accordingly, the magnetic resistance between the inner peripheral rim of the permanent magnet 35a and the tone wheel 11b becomes greater than that between the inner peripheral rim of the permanent magnet 35b and the tone wheel 11b. As a result, as shown by the arrows in FIG. 4 (B), the magnetic field due to the permanent magnet 35a becomes weaker than that due to the permanent magnet 35b. Accordingly, a magnetic flux flows in the axially central portion of the stator 36 in a direction corresponding to the magnetic field due to the permanent magnet 35b (to the left in the example of FIG. 4(B)).

In this way, with the sensor 14d of the speed sensing rolling bearing unit of the present invention, the intensity of the magnetic field formed by the pair of permanent magnets 35a, 35b changes alternately with rotation of the tone wheel 11b. Accordingly, the magnetic flux in the stator 36 is not susceptible to saturation, and flows as an alternating magnetic flux in the axially central portion of the stator 36. As a result, a sufficiently large voltage is induced in the coil 37 provided inside the inner periphery of the stator 36, giving a large output from the sensor 14d.

The sensor 14d functions in the above manner, with the output voltage induced in the coil 37 changing significantly with a frequency proportional to the rotational speed of the hub 3. Moreover with this construction there is a natural annular space within the end opening portion of the outer ring member 9. The sensor 14d can thus be installed into this limited annular space, and also the output of the sensor 14d can be made even larger. That is to say, with the speed sensing rolling bearing unit according to the present invention, the pair of permanent magnets 35a, 35b, the stator 36 and the coil 37 which constitute the sensor 14d are arranged generally circumferentially in the annular space. Moreover, the alternating magnetic flux around the whole periphery of the stator 36 flows simultaneously therearound. As a result, the amount of change in the alternating magnetic flux in the body of the sensor 14d becomes large enabling an even further increase in the output of the sensor 14d, so that rotational speed detection of the vehicle wheel which rotates together with the hub 3 can be more accurately carried out.

Figure 5:
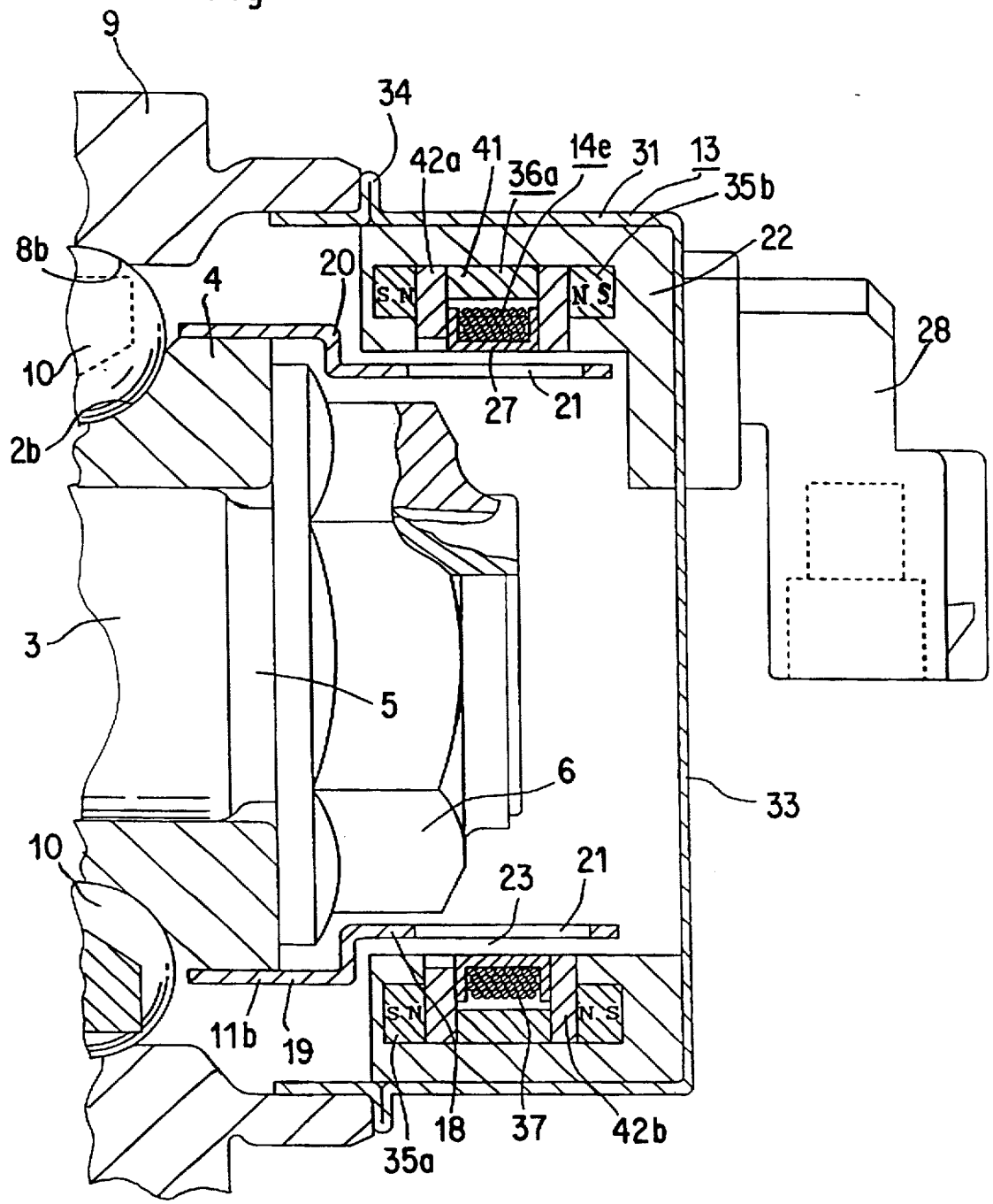
FIG. 5 is an enlarged cross-sectional view which is similar to FIG. 2 to show a second embodiment of the invention.
Figure 6:
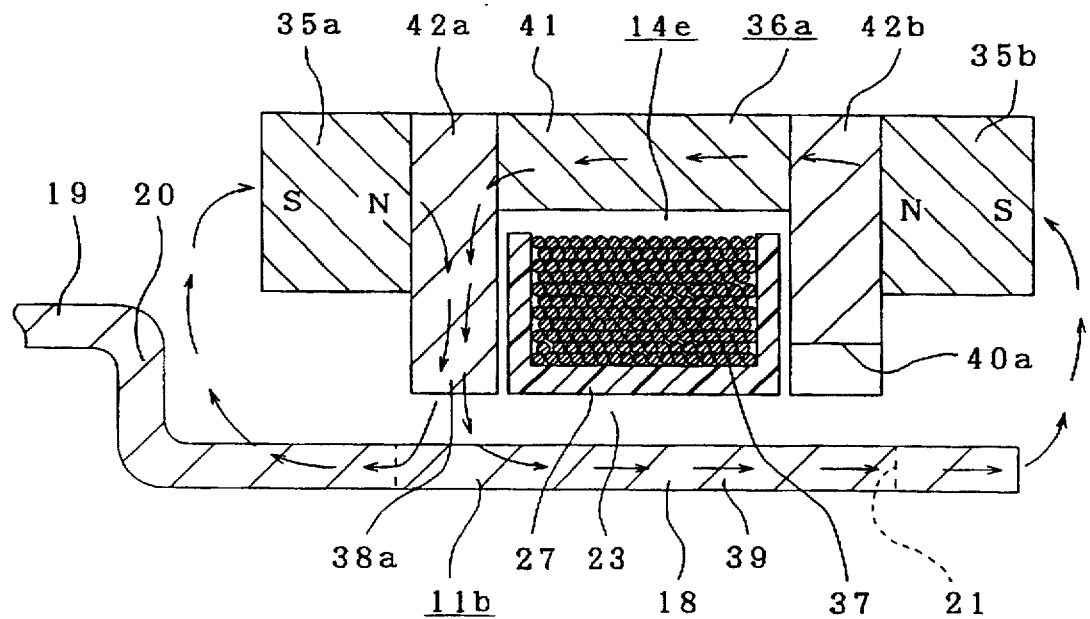
FIG. 6(A) and FIG. 6(B) are a partial enlarged cross-sectional view of the tone wheel and sensor, for explaining the conditions for changing magnetic flux in stator.
Figure 6:
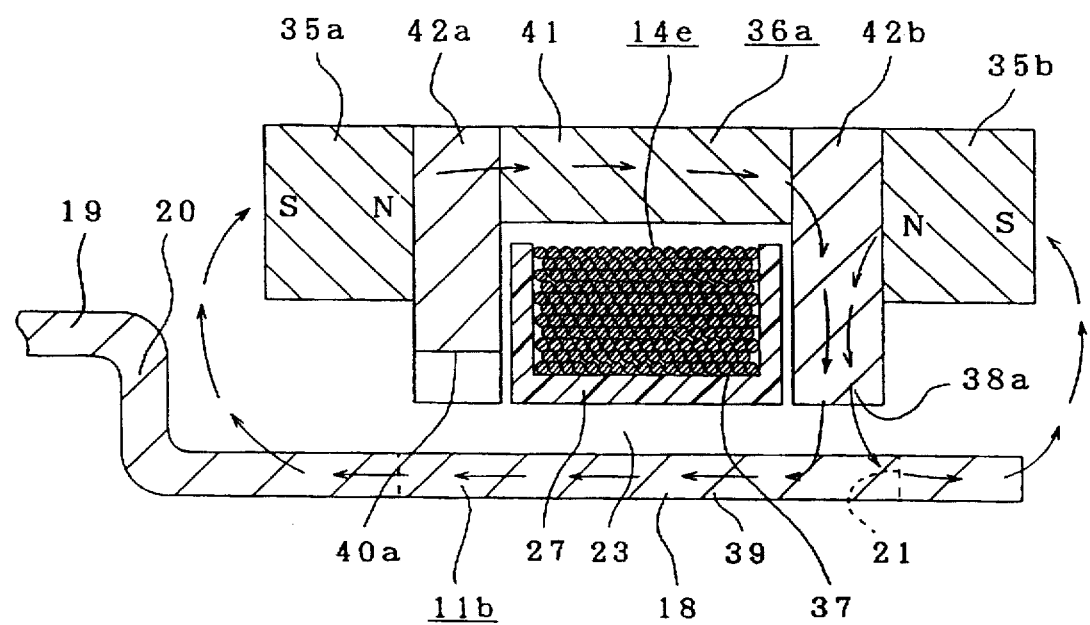

FIGS. 5 and 6 show a second embodiment of the present invention. With this embodiment, a stator 36a of a sensor 14e is comprised of a single cylindrical member 41 and a pair of ring members 42a, 42b clamping axially opposite ends of the cylindrical member 41. Inner peripheral rims of the pair of ring members 42a, 42b are formed with gear shaped recesses/protrusions in a similar manner to the inner peripheral rims of the permanent magnets 35a, 35b in the beforementioned first embodiment. The pitch of the recesses/protrusions is the same as that of the through-holes 21 formed in the small diameter portion 18 of the tone wheel 11b.

Furthermore, the phase of the recesses/protrusions formed in the inner peripheral rim of the ring member 42a (the left one in FIGS. 5 and 6) is displaced by one half with respect to the phase of the recesses/protrusions formed in the inner peripheral rim of the ring member 42b (the right one in FIGS. 5 and 6). Instead, with the phases of the recesses/ protrusions in the inner peripheral rims of the ring members 42a, 42b adjusted, the phases of through-holes faced to the respective inner peripheral rims may be displaced by one half, in a similar manner to that with the beforementioned first embodiment.

The pair of ring members 42a, 42b are clamped from axially opposite sides (left/right direction in FIGS. 5 and 6) between a pair of permanent magnets 35a, 35b. The respective permanent magnets 35a, 35b which are formed in an annular shape, are magnetized in respective axial directions. Similar poles (for example north poles in FIGS. 5 and 6) of the respective permanent magnets 35a, 35b are abutted against the opposite side faces of the assembly of the ring members 42a, 42b and stator 36a, so that the permanent magnets 35a, 35b are magnetically connected to the stator 36a. A coil 37 is fitted inside the cylindrical member 41, and clamped between the ring members 42a, 42b.

During use of the speed sensing rolling bearing unit constructed as described above, the hub 3 and tone wheel 11b rotate together so that an electromotive force which changes with a frequency proportional to the rotational speed of the tone wheel 11b, is induced in the coil 37 of the sensor 14e.

At first, as shown in FIG. 6(A), at the point in time wherein the protrusions 38a of the recesses/protrusions formed in the inner peripheral rim of the ring member 42a are opposed to the columns 39 between the adjacent through-holes 21, the recesses 40a of the recesses/ protrusions formed in the inner peripheral rim of the ring member 42b are opposed to the columns 39. Accordingly, the magnetic resistance between the inner peripheral rim of the ring member 42a and the tone wheel 11b becomes smaller than that between the inner peripheral rim of the ring member 42b and the tone wheel 11b. As a result, as shown by the arrow in FIG. 6 (A), the magnetic flux due to the permanent magnets 35a, 35b flows by way of the ring member 42a. Accordingly a magnetic flux flows towards the left in FIG. 6(A), in the cylindrical member 41 constituting the axially central portion of the stator 36a.

On the other hand, as shown in FIG. 6(B), at the point in time wherein the recesses 40a of the recesses/protrusions formed in the inner peripheral rim of the ring member 42a are opposed to the columns 39, the protrusions 38a of the recesses/protrusions formed in the inner peripheral rim of the ring member 42b are opposed to the columns 39. Accordingly, the magnetic resistance between the inner peripheral rim of the ring member 42a and the tone wheel 11b becomes greater than that between the inner peripheral rim of the ring member 42b and the tone wheel 11b. As a result, as shown by the arrow in FIG. 6(B), the magnetic flux due to the permanent magnets 35a, 35b flows by way of the ring member 42b. Accordingly a magnetic flux flows towards the right in FIG. 6(B), in the cylindrical member 41.

In this way, the magnetic flux due to the pair of permanent magnets 35a, 35b, flows alternately in the cylindrical member 41 of the sensor 14e, with rotation of the tone wheel 11b. Accordingly, the magnetic flux in the stator 36a is not susceptible to saturation, and flows as an alternating magnetic flux in the cylindrical member 41 of the stator 36a. As a result, a sufficiently large voltage is induced in the coil 37 provided inside the cylindrical member 41, giving a large output from the sensor 14e.

With the example shown in FIGS. 6(A) and (B), an overall annular shaped stator 36a of C-shape in cross section comprises a single cylindrical member 41 assembled together with a pair of ring members 42a, 42b. However a stator 36a having such a shape may be formed as a single body from a magnetic material. In this case however care must be taken for easy assembly of the coil 37. It is necessary for example to bend one of the axial ends of the stator 36a inwards after assembling the coil 37.

With the first and second embodiments, the sensors 14d, 14e are arranged around the tone wheel 11b. However in contrast to this, the sensor may be arranged radially inward of the tone wheel. By arranging the sensor radially inward of the tone wheel in this manner, the peripheral speed of the portion on the tone wheel in which the through-holes are formed may be increased, enabling an increase in sensor output.

Figure 7:
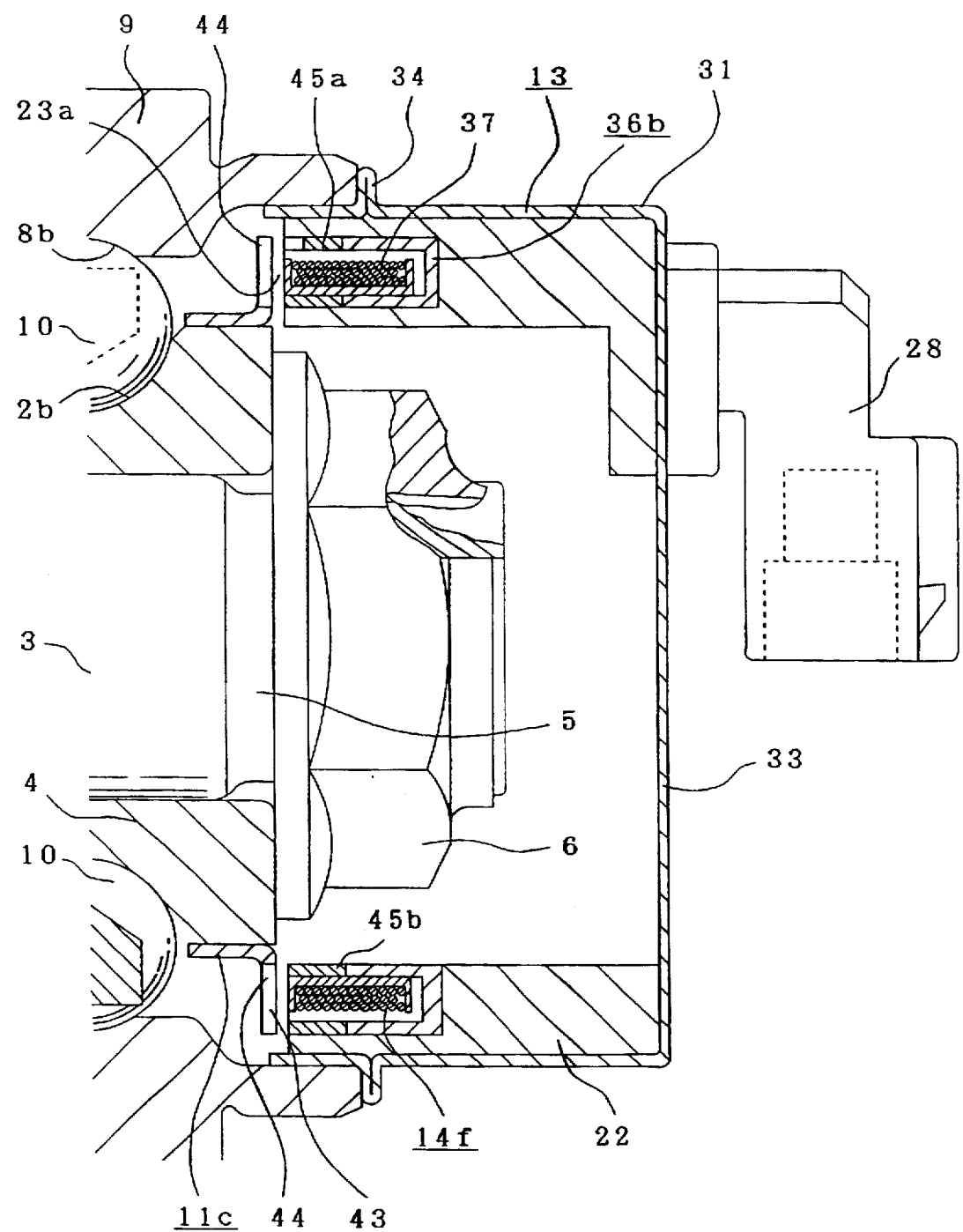
FIG. 7 is an enlarged cross-sectional view which is similar to of FIG. 2 to show a third embodiment of the invention.

FIG. 7 shows a third embodiment of the present invention. With this embodiment, a tone wheel 11c formed in an overall annular shape of L-shape in cross section, is externally fixed to the axially end portion of an inner ring 4. A disc portion 43 in an outward flange shape of the tone wheel 11c is formed with a plurality of cut-outs 44 at even spacing around the circumferential direction to form a cutout section. A pair of permanent magnets 45a, 45b of a sensor 14f, respectively magnetized in the axial direction (left/right direction in FIG. 7), are arranged in concentric rings. One of the end faces in magnetized direction of the respective permanent magnets 45a, 45b is faced to the disc portion 43 in the thrustwise direction across a small gap 23a. These end faces (left end in FIG. 7) in magnetized direction are formed with recesses/protrusions in a gear shape, with the phase of the recesses/protrusions of the permanent magnet 45a displaced by one half with respect to the phase of the recesses/protrusions of the permanent magnet 45b.

The other end faces (right end in FIG. 7) in magnetized direction of the permanent magnets 45a, 45b are abutted against opposite ends of an annular shaped stator 36b of C-shape in cross section. The magnetic poles of the permanent magnets 45a, 45b which are abutted with the corresponding faces of the stator 36b, are of the same polarity. A coil 37 is nested, that is disposed in a region surrounded by three sides formed by the pair of permanent magnets 45a, 45b and the stator 36b.

With the present embodiment constructed in this manner, a voltage which changes with a frequency proportional to the rotational speed of the tone wheel 11c is induced in the coil 37 with rotation of the tone wheel 11c, due to the same operation as for the first embodiment.

Now, although not shown in the FIGS. 5 and 6, if there is surplus space in the diametric dimension where the tone wheel is located, then the arrangement direction of the components of the sensor 14e shown in FIGS. 5 and 6 can be changed from a thrustwise direction to a radial direction, so that the sensor is faced to the tone wheel in the thrustwise direction, as with the third embodiment of FIG. 7.

FIG. 8 shows a fourth embodiment of the present invention. With this embodiment, from one to several tongues 46 are provided on inner peripheral rims at opposite ends of a synthetic resin bobbin 27a on which a coil 37 is wound. These tongues 46 are engaged, without circumferential play, with recesses 40 formed in inner peripheral rims of permanent magnets 35a, 35b of a sensor 14g. By engaging the pair of permanent magnets 35a, 35b in this manner by means of the bobbin 27a, then when embedding the sensor 14g in the synthetic resin body 22 (see FIGS. 1, 2), displacement of the phase of the permanent magnets 35a, 35b in the circumferential direction from the desired condition can be avoided. Therefore, with the embodiment in FIG. 8, the phase of the tongues 46 at the opposite end faces of the bobbin 27a, is displaced by half the pitch in the circumferential direction, of the recesses 40 formed in the pair of permanent magnets 35a, 35b.

The required number of tongues 46 in the opposite ends of the bobbin 27a is a minimum of one at each end face, up to a maximum of the number of recesses 40. Preferably the number of tongues 46 should be the minimum so long as the phase of the permanent magnets 35a, 35b is reliably controlled at the desired condition, and the width should be narrow. This is so that the gap between the opposite ends of the bobbin 27a and the side faces of the permanent magnets 35a, 35b is sufficiently maintained so that, at the time of embedding the sensor 14g within the synthetic resin body 22, the unset resin can flow smoothly into the region of the coil 37, whereby defects such as voids do not occur in the synthetic resin body 22.

In FIG. 8, with the phases of the recesses 40 of the permanent magnets 35a, 35b adjusted, the phases of the through-holes 21a may be displaced by one half, as mentioned beforehand. Of course in this case the circumferential direction phases of the tongues 46 at the opposite ends of the bobbin 27a are made to agree with each other.

Now with the respective embodiments shown in the figures, since the present invention is shown applied to a bearing unit for supporting a non driven wheel (front wheel of a rear wheel drive vehicle, or rear wheel of a front wheel drive vehicle), then the cover 13 for supporting the sensors 14d through 14f is formed with the inner end sealed. However, the present invention is not limited to bearing units used for non driven wheels, and is also applicable to bearing units for driving or driven wheels (rear wheel of a rear wheel drive vehicle, or front wheel of a front wheel drive vehicle). When the present invention is applied to a bearing unit for a driving or driven wheel, then the cover is formed in a ring shape, with an aperture provided in a central portion for insertion of part of a constant velocity joint. Moreover, the hub will be of a cylindrical shape with female splines formed in the inner peripheral face for engaging with male splines on the outer peripheral face of the drive shaft.

The present invention may also be applied to rolling bearing units with the inner ring fixed and the outer ring member rotating. Naturally in this case, the tone wheel will be provided on the outer ring member, and the cover and the sensor provided on the inner ring assembly.

Furthermore, an arrangement is also possible wherein at one axial end of the sensor, the tone wheel and the permanent magnets are faced to each other, such as with the first embodiment shown in FIGS. 1 to 4, while at the other axial end, the tone wheel and the stator are faced to each other, such as with the second embodiment shown in FIGS. 5 and 6.

Figure 9:
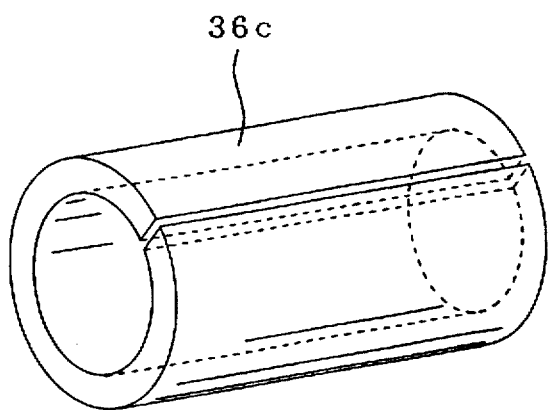
FIG. 9 is an enlarged perspective view of the stator to show a fifth embodiment of the invention.

So long as the stators of the sensors of the respective embodiments have the magnetic flux flowing in the axial direction, they need not be made in a completely cylindrical shape (of closed cross section). For example, the sensor may be made using a stator 36c of FIG. 9, which shows a fifth embodiment of the present invention. This stator 36c is made by rolling a magnetic metal plate such as low carbon steel plate into a round tube having a slit to be of C-shape in cross section. A stator 36c of such a shape differs from the fully cylindrical shaped stator in that it can be made at low cost by a simple process involving merely rolling a steel sheet, without the need for a difficult deep drawing process. In addition, after rolling the magnetic metal plate to a predetermined diameter, the non-connected portion can be welded at intervals by spot welding (for example at one or two points) to maintain the dimensions. While there is no objection to welding the non-connected portion along the full length, this will increase cost. Instead of welding, the inner diameter in the free condition may be made a little smaller than a predetermined value so that the permanent magnets 35a, 35b (see FIGS. 1 and 2) internally fit into the stator 36c with the inner diameter of the stator 36c resiliently expanded thereby. In this case, the outer peripheral faces of the respective permanent magnets 35a, 35b and the inner peripheral faces at opposite ends of the stator 36c can be resiliently contacted together without undue force. The magnetic resistance between the permanent magnets 35a, 35b and the stator 36c can therefore be minimized.

When as with the present invention, the magnetized direction of the permanent magnets in the sensor does not change around the whole circumference, then compared to configurations wherein this does change, the rotational speed detection accuracy can be improved. Also the manufacture of the permanent magnets 35a, 35b can be simplified and the cost of parts reduced.

The theory related to the improvement in rotational speed detection accuracy with the construction wherein the magnetized direction of the permanent magnet does not change around the circumference, will now be explained. In the case wherein south and north poles are arranged alternately around the circumference, it is necessary to minimize the flux flowing directly between the adjacent south and north poles (i.e. not via the tone wheels). For example, when the ratio (i.e. P/T) between the pitch in the circumferential direction of the alternately repeating south and north poles, and the thickness T of the small gap between the end face in magnetized direction of the permanent magnet and the tone wheel is small, then the proportion of flux flowing directly from the north poles to the adjacent south poles is large.

Figure 10:
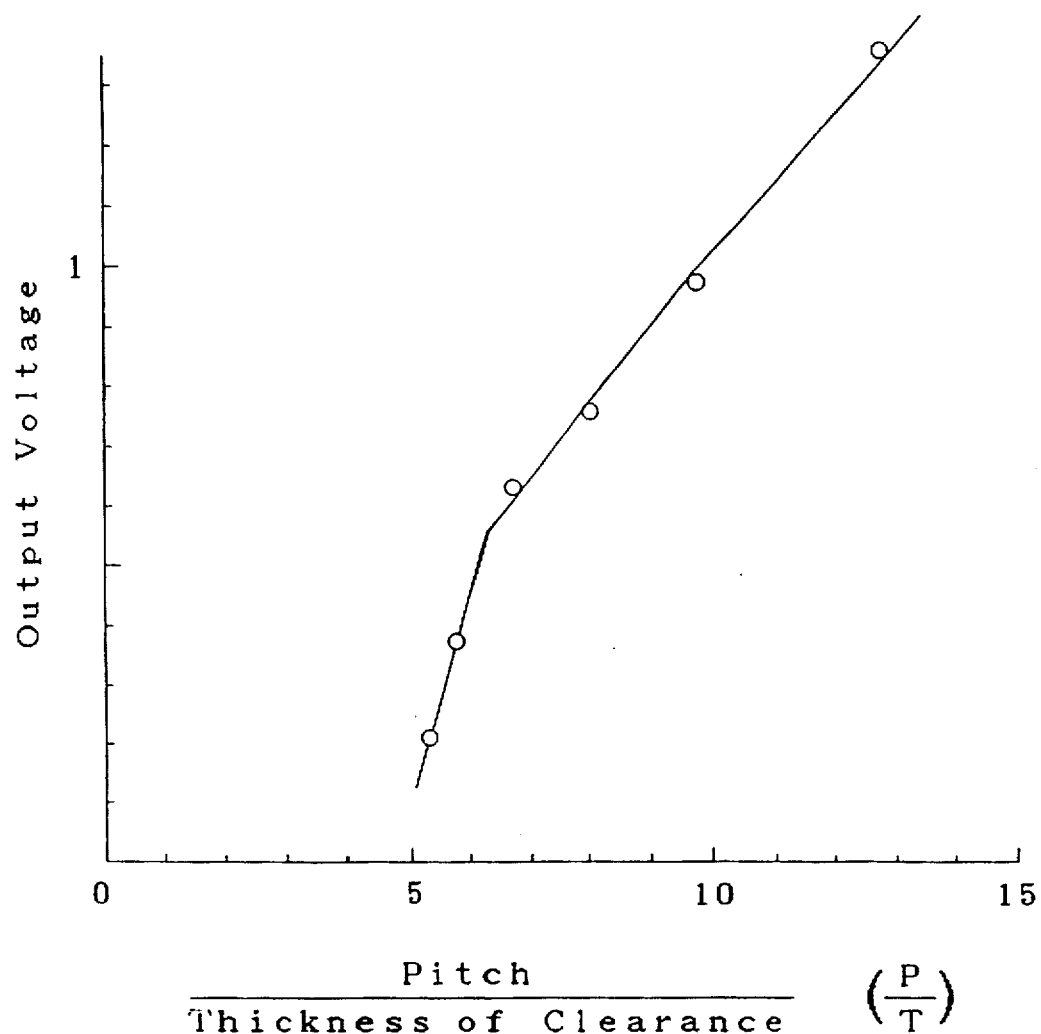
FIG. 10 is a graph to show the relation between the sensor output and the ratio of the pitch of the S and N poles and notches to the thickness of the small clearance.

FIG. 10 shows the inventor's test results of the effects of the aforementioned ratio (P/T) on the output voltage of the sensor when using a permanent magnet whose magnetic orientation changes in the circumferential direction. In FIG. 10, when the aforementioned ratio (P/T) is 10, the output voltage of the sensor is 1.0, and the figure shows the size of the output when this ratio (P/T) is changed. As can be clearly seen from FIG. 10, the output voltage drops suddenly when the ratio (P/T) is 6.5.

The thickness T of the small gap between the end face in magnetic orientation of the permanent magnet and the tone wheel must be at least 0.6 mm. This is to prevent any contact between the sensor and the tone wheel regardless of the elastic deformation of the components that occurs when the bearing unit is operating. Also, the pitch P of alternating South and North poles on the end face in magnetic orientation of the permanent magnet (equal to the pitch of the notches formed on the tone wheel), must be at less 3.9 mm (0.6 mm×6.5) in order to obtain sufficient output.

If this pitch P is large (3.9 mm or more), it is not possible to have a large number of North and South poles in the circumferential direction, or a large number of cutouts in the tone wheel. If it is not possible to have a large number of North or South poles and cutouts, the number of times the output changes per rotation of the wheel becomes small (the interval between output changes becomes large), and it is not possible to accurately detect the rotational speed at slow speeds. In other words, the precision of the rotational speed detector becomes low.

In contrast to this, if the construction is such that the magnetic orientation of the permanent magnet does not change in the circumferential direction, most of the magnetic flux flows through the tone wheel even though the pitch of the rotating cut-out section and stationary cut-out section is less than 3.9 mm. As a result, the characteristics differ from those shown in FIG. 10, and even if the pitch of the cut-out sections is less than 3.9 mm, there is no sudden drop in output. Also, it is possible to improve the precision for detecting the rpm by decreasing the pitch of these cut-out sections.

In each of the embodiments of the invention described above, in order to detect the rotational speed accurately, it is best if the maximum density of the magnetic flux flowing from the end in the magnetized direction of the permanent magnet and through the stator and tone wheel be at least 1000 Gauss. The reason for this is as follows. The sensor that makes up the rotational speed detector built into the bearing unit is exposed to constant external magnetic fields and to the residual magnetism of the components of the bearing unit. In order to detect the rotational speed accurately, it is necessary to make the effect of these external magnetic fields and residual magnetism as small as possible.

The errors in pitch of the notches and holes formed on the rotating and stationary cut-out sections, and the protrusions etc. must be within 1 to 2%. Also, it is best if the effects due to external magnetic fields and residual magnetism be held within 1 to 2% in order to accurately detect the rotational speed. In regards to this, the normal residual magnetism in the inner ring and outer ring member of the bearing unit is about 10 Gauss. Therefore, in order to keep the effects of this residual magnetism within 1%, it is best if the maximum density of the magnetic flux be about 1000 Gauss. For construction where the magnetic orientation of the permanent magnet does not change in the circumferential direction, there is no real problem even if the maximum density of the magnetic flux is 1000 Gauss or more. In contrast to this, for construction where the North and South poles alternate in the circumferential direction, if the maximum density of the magnetic flux is increased, the percentage of the magnetic flux flowing directly between adjacent North and South poles becomes large, and the output of the sensor becomes smaller. From this point as well, in order to accurately detect the rotational speed, it is desirable that the magnetic orientation of the permanent magnet does not change in the circumferential direction.

Figure 11:
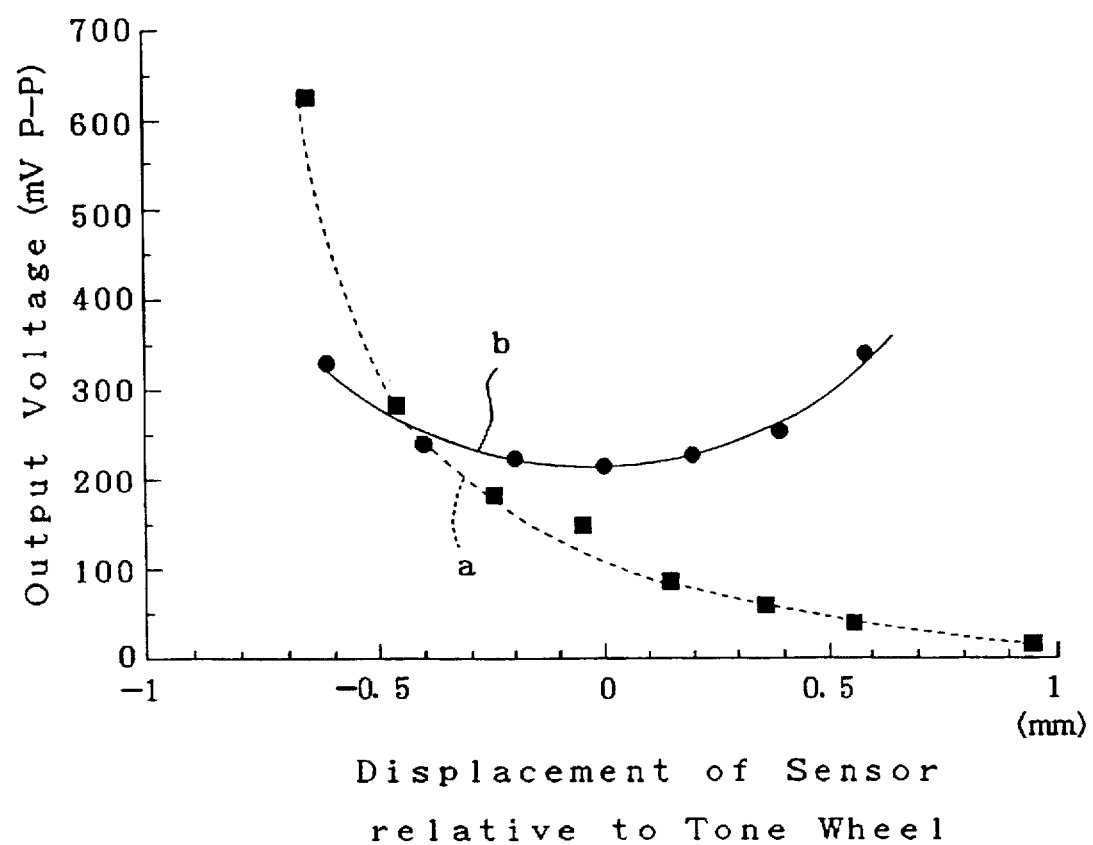
FIG. 11 is a graph to show the relation between the axial displacement of the sensor and the sensor output.
Figure 12:
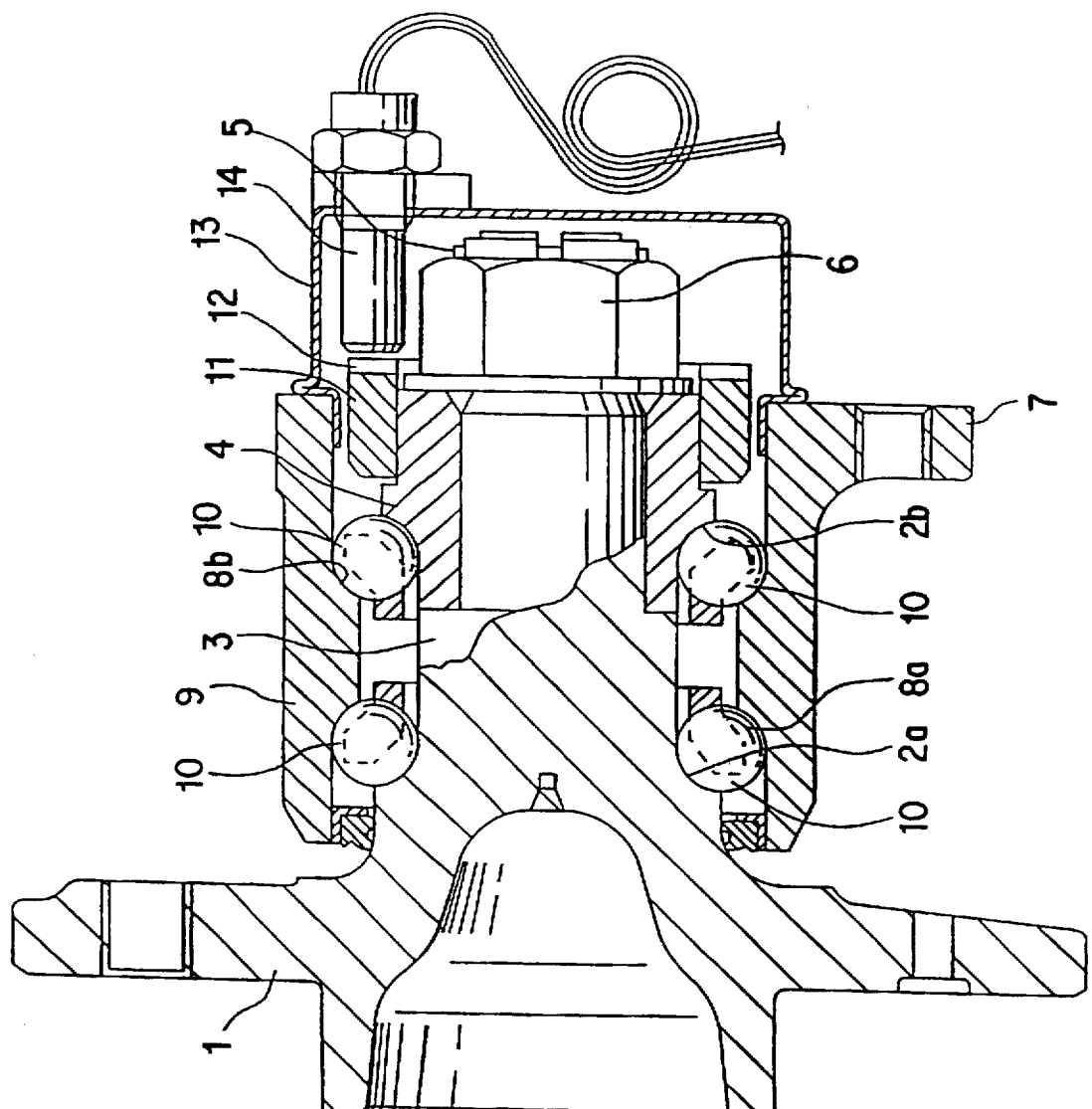
FIG. 12 is a cross sectional view of one example of the prior art rolling bearing unit with rotating speed sensor.
Figure 13:
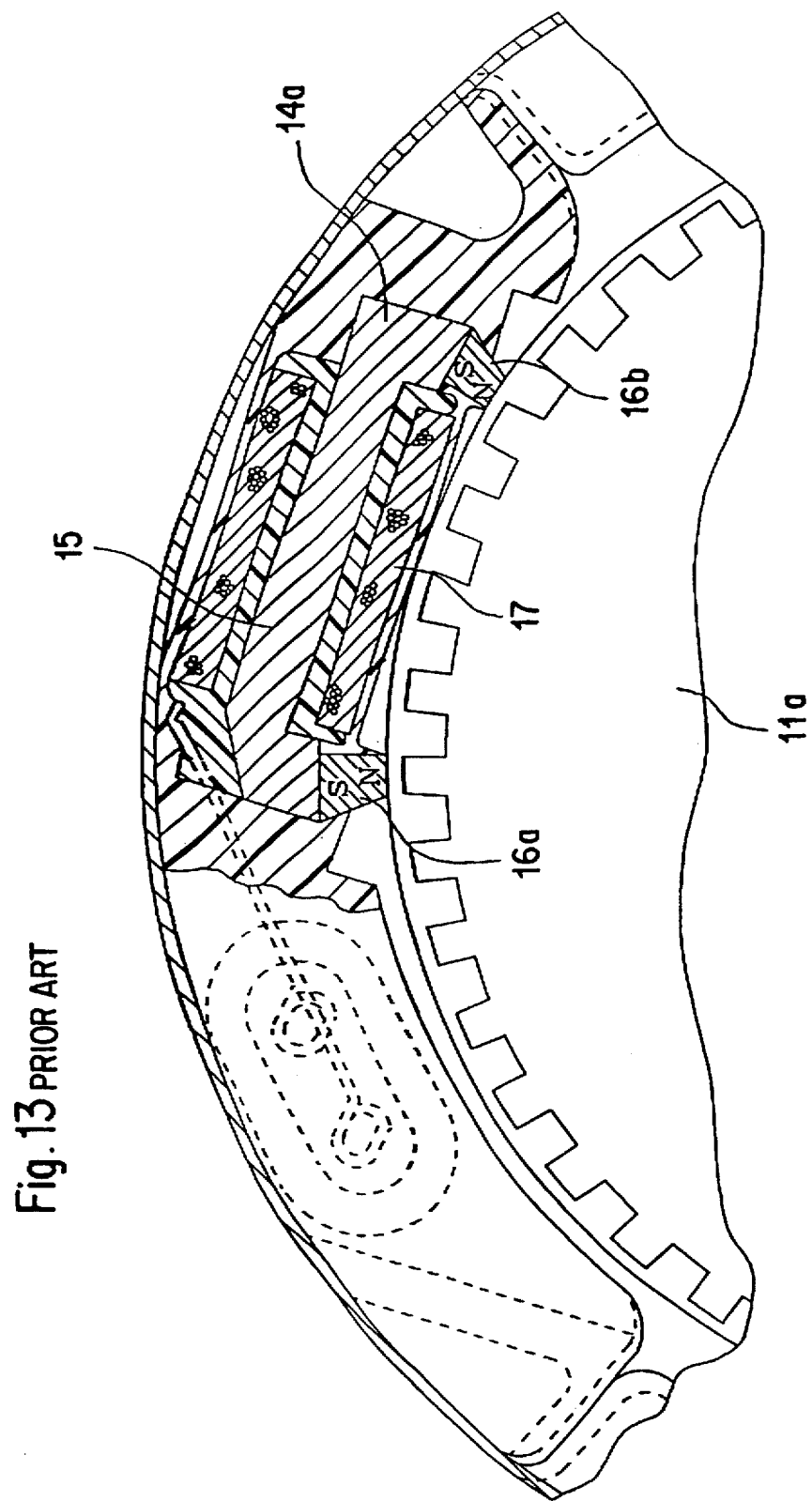
FIG. 13 is a cross sectional view of second example of the prior art rolling bearing unit with rotating speed sensor.
Figure 14:
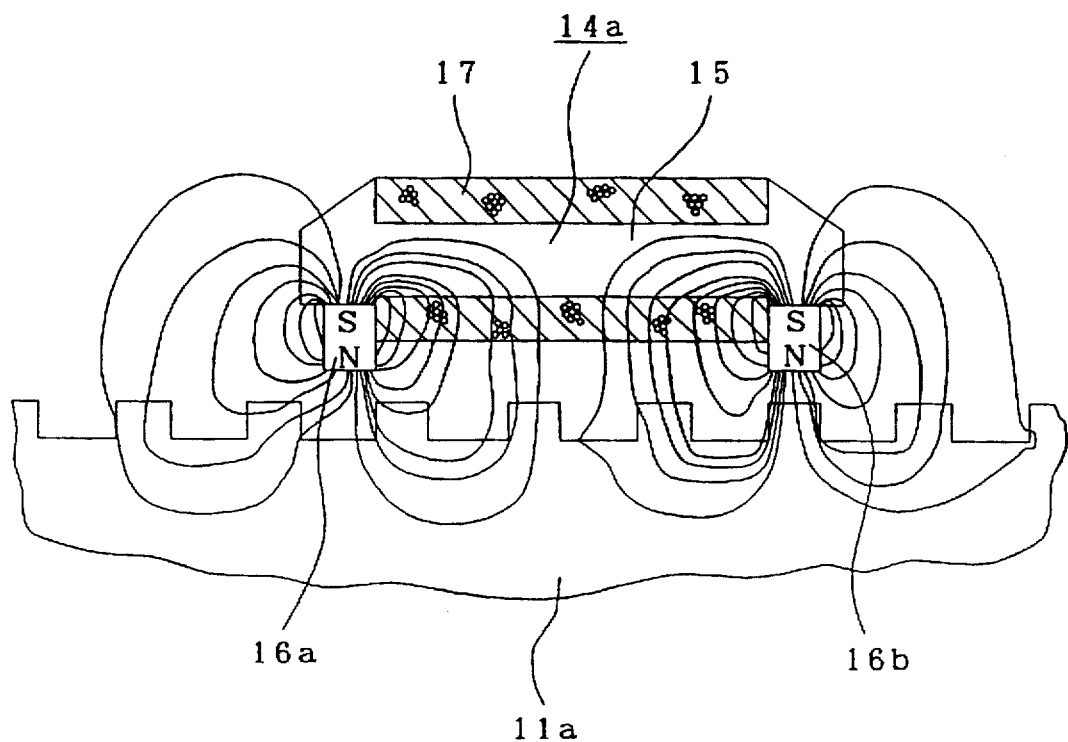
FIG. 14 is an enlarged cross-sectional view of FIG. 13.
Figure 15:
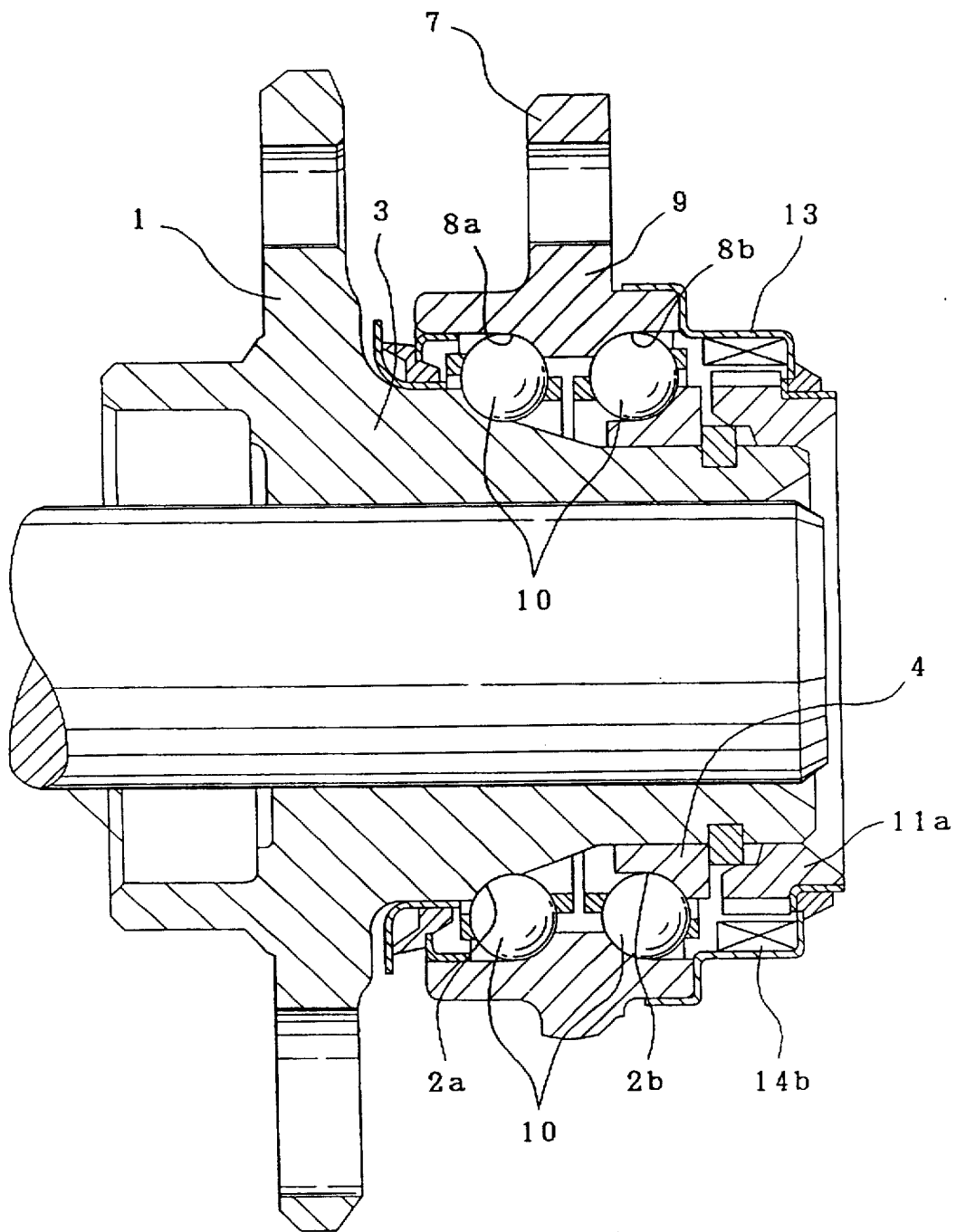
FIG. 15 is a cross sectional view of third example of the prior art rolling bearing unit with rotating speed sensor.

Furthermore, in the case of the construction of this invention, where an annular-shaped sensor is used and the peripheral surface of this sensor is generally faced to the peripheral surface of the tone wheel, the output of the sensor is stable regardless of the displacement of the sensor with respect to the tone wheel. In other words, in the prior art construction, as in FIG. 12 to FIG. 14, the output of the sensor changed as shown by the dotted line "a" in FIG. 11, due to the displacement of the sensor with respect to the tone wheel. In contrast to this, when an annular-shaped sensor is used, the output of the sensor changes as shown by the solid line "b" of FIG. 11, due to the displacement of the sensor with respect to the tone wheel. As can be clearly seen from FIG. 11, in the construction of this invention which uses an annular-shaped sensor, it is possible to stabilize the output of the sensor. The reason for this is that when the distance between the peripheral surface of the sensor and the surface of the tone wheel becomes small in one portion it becomes large in another portion, thus there are no large effects on the output of the sensor as a whole.

The rolling bearing unit with rotational speed detector of this invention, constructed and used as described above, reduces the dimensions in the axial direction, and thus it can be installed in the limited space of a compact-sized automobile, simplifying the vehicle design. Moreover, in the case of rolling bearing unit with rotational speed sensor of this invention, the output of the sensor is made larger, making it possible to improve the accuracy and reliability of detecting the rotational speed of the automobile wheel supported by the rolling bearing.

What is claimed is:

1. A rolling-bearing unit with rotational speed sensor comprising a stationary ring that has an axial end and a first peripheral surface formed with a stationary raceway thereon, a cover attached to the axial end of this stationary ring, a rotating ring that has an axial end and a second peripheral surface opposed to the first peripheral surface and formed with a rotating raceway thereon, a plurality of rolling bodies that rotate freely between the stationary raceway and the rotating raceway, an annular magnetic tone wheel that is attached to the axial end of the rotating ring and has a rotating cutout section having cutouts formed at equal intervals with a pitch all the way around in the circumferential direction, and a sensor that is supported inside the cover so as to be faced to the tone wheel.

the sensor comprising a pair of annular or cylindrical permanent magnets provided concentric with the rotating ring and each having first and second ends in magnetic orientation corresponding to first and second magnetic poles, respectively, an annular or cylindrical stator of magnetic material magnetically connected with said first end of each of the permanent magnets and provided concentric with the rotating ring, and an annular or cylindrical coil provided concentric with the rotating ring proximate a central portion of the stator, the second ends of each of the permanent magnets faced to the cutout section of the tone wheel with a small clearance therebetween, and formed with recesses and protrusions with the same pitch as in the cutout section of the tone wheel, the phase of the recesses and protrusions formed in one of the magnets relative to the cutout section being displaced by one half from the phase of the recesses and protrusions formed in the other of the magnets relative to the cutout section.

2. The rolling bearing unit of claim 1, wherein the pitch of the cutouts and of the recesses and protrusions is up to 3.9 mm.

3. The rolling bearing unit of anyone of claims 1 and 2, wherein the magnetic flux flowing from one end face in magnetic orientation of the permanent magnet to the stator and tone wheel has a maximum density over 1000 Gauss.

4. A rolling-bearing unit with rotational speed sensor comprising a stationary ring that has an axial end and a first peripheral surface formed with a stationary raceway thereon, a cover attached to the axial end of this stationary ring, a rotating ring that has an axial end and a second peripheral surface opposed to the first peripheral surface and formed with a rotating raceway thereon, a plurality of rolling bodies that rotate freely between the stationary raceway and the rotating raceway, an annular magnetic tone wheel that is attached to the axial end of the rotating ring and has a rotating cutout section having cutouts formed at equal intervals with a pitch all the way around in the circumferential direction, and a sensor that is supported inside the cover so as to be faced to the tone wheel, the sensor comprising a pair of annular or cylindrical permanent magnets provided concentric with the rotating ring and having first and second ends in magnetic orientation corresponding to first and second magnetic poles, an annular or cylindrical stator with first and second ends made of magnetic material in magnetic communication with the permanent magnets, and provided concentric with the rotating ring, and an annular or cylindrical coil provided concentric with the rotating ring proximate a central portion of the stator, the ends with the same pole in magnetic orientation of the pair of permanent magnets being abutted to the ends of the stator, respectively, the ends of the stator being faced to the cutout section of the tone wheel with a small clearance therebetween, and, the ends of the stator faced to the cutout section with the small clearance therebetween formed with recesses and protrusions with the same pitch as in the cutout section of the tone wheel, the phase of the recesses and protrusions formed in one of the ends of the stator relative to the cutout section being displaced by one half from the phase of the recesses and protrusions formed in the other of the ends of the stator relative to the cutout section.

5. The rolling bearing unit of claim 4, wherein the pitch of the cutouts and of the recesses and protrusions is up to 3.9 mm.

6. The rolling bearing unit of anyone of claims 4 and 5, wherein the magnetic flux flowing from one end face in magnetic orientation of the permanent magnet to the stator and tone wheel has a maximum density over 1000 Gauss.

7. A rolling-bearing unit with rotational speed sensor comprising a stationary ring that has an axial end and a first peripheral surface formed with a stationary raceway thereon, a cover attached to the axial end of this stationary ring, a rotating ring that has an axial end and a second peripheral surface opposed to the first peripheral surface and formed with a rotating raceway thereon, a plurality of rolling bodies that rotate freely between the stationary raceway and the rotating raceway, an annular magnetic tone wheel that is attached to the axial end of the rotating ring and has a rotating cutout section having cutouts formed at equal intervals with a pitch all the way around in the circumferential direction, and a sensor that is supported inside the cover so as to be faced to the tone wheel, said sensor including an annular or cylindrical stator of magnetic material, a pair of annular or cylindrical permanent magnets, and an annular or cylindrical coil, said stator being arranged concentric with said tone wheel and having opposite axial end portions and a central portion between said end portions, each of said magnets having an outer peripheral face and an inner peripheral face, said outer peripheral faces of said magnets being magnetized to a like magnetic pole and said inner peripheral faces of said magnets being magnetized to an opposite magnetic pole, one of said peripheral faces of said magnets being arranged close to or in contact with said opposite axial end portions of said stator, respectively, and the other of said peripheral faces of said magnets facing and spaced at a distance from said cutout section of the tone wheel and being formed with a plurality of alternating recesses and protrusions with the same pitch as said pitch of the cutout section, the phase of the recesses and protrusions of one of the magnets relative to said cutout section being displaced by one half from the phase of the recesses and protrusions of the other of the magnets relative to said cutout section, said coil being provided concentric with said tone wheel proximate said central portion of the stator and between said magnets.

8. The rolling bearing unit of claim 7, wherein the pitch of the cutouts and of the recesses and protrusions is up to 3.9 mm.

9. The rolling bearing unit of claim 7, wherein the magnetic flux flowing from one peripheral face of the permanent magnet to the stator and tone wheel has a maximum density over 1000 Gauss.

10. The rolling bearing unit of claim 8, wherein the magnetic flux flowing from one peripheral face of the permanent magnet to the stator and tone wheel has a maximum density over 1000 Gauss.

11. A rolling-bearing unit with rotational speed sensor comprising a stationary ring that has an axial end and a first peripheral surface formed with a stationary raceway thereon, a cover attached to the axial end of this stationary ring, a rotating ring that has an axial end and a second peripheral surface opposed to the first peripheral surface and formed with a rotating raceway thereon, a plurality of rolling bodies that rotate freely between the stationary raceway and the rotating raceway, an annular magnetic tone wheel that is attached to the axial end of the rotating ring and has a rotating cutout section having cutouts formed at equal intervals with a pitch all the way around in the circumferential direction, and a sensor that is supported inside the cover so as to be faced to the tone wheel, said sensor including an annular or cylindrical stator of magnetic material, a pair of annular or cylindrical permanent magnets, and an annular or cylindrical coil, said stator being arranged concentric with said tone wheel and including a cylindrical portion having opposite axial end portions, and a pair of ring portions extending radially toward said tone wheel from said opposite axial end portions, respectively, said ring portions each having a peripheral face spaced at a distance from and facing said cutout section of the tone wheel and being formed with a plurality of alternating recesses and protrusions with the same pitch as said pitch of the cutout section, the phase of the recesses and protrusions of one of the ring portions relative to said cutout section being displaced by one half from the phase of the recesses and protrusions of the other of the ring portions relative to said cutout section, said magnets being abutted to opposite axial side faces of said stator, respectively, with an axially inner end face of each of said magnets facing said stator and being magnetized to a like magnetic pole, and with an axially outer end face of each of said magnets facing away from said stator and being magnetized to an opposite magnetic pole, said coil being provided concentric with said tone wheel proximate said cylindrical portion and between said ring portions.

12. The rolling bearing unit of claim 11, wherein the pitch of the cutouts and of the recesses and protrusions is up to 3.9 mm.

13. The rolling bearing unit of claim 11, wherein the magnetic flux flowing from one end face of the permanent magnet to the stator and tone wheel has a maximum density over 1000 Gauss.

14. The rolling bearing unit of claim 12, wherein the magnetic flux flowing from one end face of the permanent magnet to the stator and tone wheel has a maximum density over 1000 Gauss.

15. The rolling bearing unit of claim 11, wherein said cylindrical portion and said pair of ring portions are formed as a single body from a magnetic material.

16. The rolling bearing unit of claim 11, wherein said cylindrical portion and said pair of ring portions are formed as separate components.

* * * * *